United States Patent
De Pasquale et al.

(10) Patent No.: US 10,123,377 B2
(45) Date of Patent: Nov. 6, 2018

(54) RADIO RESOURCE MANAGEMENT IN A TELECOMMUNICATION SYSTEM

(71) Applicant: VODAFONE IP LICENSING LIMITED, Newbury, Berkshire (GB)

(72) Inventors: Andrea De Pasquale, Madrid (ES); Inigo Guemes Cabrejas, Madrid (ES); Yannick Le Pezennec, Madrid (ES); Santiago Tenorio Sanz, Madrid (ES)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 0 days.

(21) Appl. No.: 15/518,543

(22) PCT Filed: Oct. 9, 2015

(86) PCT No.: PCT/EP2015/073360
§ 371 (c)(1),
(2) Date: Apr. 12, 2017

(87) PCT Pub. No.: WO2016/058918
PCT Pub. Date: Apr. 21, 2016

(65) Prior Publication Data
US 2017/0280504 A1    Sep. 28, 2017

(30) Foreign Application Priority Data

Oct. 13, 2014  (EP) .................................. 14382390
Dec. 5, 2014  (EP) .................................. 14382497
Dec. 5, 2014  (EP) .................................. 14382499

(51) Int. Cl.
*H04W 84/04*    (2009.01)
*H04W 76/15*    (2018.01)
(Continued)

(52) U.S. Cl.
CPC ............. *H04W 84/04* (2013.01); *H04L 5/001* (2013.01); *H04L 5/0035* (2013.01);
(Continued)

(58) Field of Classification Search
CPC ....... H04L 67/10; H04L 67/12; H04L 1/0003; H04L 5/0023; H04L 67/1002;
(Continued)

(56) References Cited

U.S. PATENT DOCUMENTS 7,831,252 B2    11/2010    Shang et al.
2006/0088004 A1    4/2006    Casey et al.
(Continued)

FOREIGN PATENT DOCUMENTS

EP    1551194    7/2005
EP    1587271    10/2005
(Continued)

OTHER PUBLICATIONS

International Search Report and Written Opinion issued in PCT/EP2015/073360 dated Feb. 10, 2016.
(Continued)

*Primary Examiner* — Kwasi Karikari
(74) *Attorney, Agent, or Firm* — Workman Nydegger

(57) ABSTRACT

By first determining whether network conditions make it possible and necessary to assist the network in supporting communication devices in comparatively poor radio coverage, and then periodically determining what type of assistance would best improve the overall network performance, a cellular telecommunications network is dynamically adapted to improve overall network performance without requiring the introduction of new network equipment. In one example, the dynamic activation of the radio coverage
(Continued)

assistance serves to reduce problems associated with users at the cell edge, resulting in improvements in overall cell capacity.

15 Claims, 10 Drawing Sheets

(51) Int. Cl.
| | |
|---|---|
| H04L 5/00 | (2006.01) |
| H04W 16/26 | (2009.01) |
| H04W 36/24 | (2009.01) |
| H04W 52/02 | (2009.01) |
| H04W 64/00 | (2009.01) |
| H04W 88/04 | (2009.01) |
| H04W 36/32 | (2009.01) |
| H04W 24/08 | (2009.01) |
| H04W 76/10 | (2018.01) |
| H04W 88/10 | (2009.01) |
| H04W 36/04 | (2009.01) |

(52) U.S. Cl.
CPC .......... *H04L 5/0098* (2013.01); *H04W 16/26* (2013.01); *H04W 24/08* (2013.01); *H04W 36/24* (2013.01); *H04W 36/32* (2013.01); *H04W 52/0238* (2013.01); *H04W 52/0254* (2013.01); *H04W 64/006* (2013.01); *H04W 76/10* (2018.02); *H04W 76/15* (2018.02); *H04W 88/04* (2013.01); *H04W 36/04* (2013.01); *H04W 52/0258* (2013.01); *H04W 52/0277* (2013.01); *H04W 84/045* (2013.01); *H04W 84/047* (2013.01); *H04W 88/10* (2013.01); *Y02D 70/00* (2018.01); *Y02D 70/122* (2018.01); *Y02D 70/1242* (2018.01); *Y02D 70/1244* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/21* (2018.01); *Y02D 70/23* (2018.01)

(58) Field of Classification Search
CPC .......... H04L 67/1014; H04L 67/1038; H04W 36/0005; H04W 36/34; H04W 48/02; H04W 76/11; H04W 84/18; H04W 24/02; H04W 4/023; H04W 4/02
See application file for complete search history.

(56) References Cited

U.S. PATENT DOCUMENTS

| | | | |
|---|---|---|---|
| 2008/0080436 | A1 | 4/2008 | Sandhu et al. |
| 2009/0135795 | A1 | 5/2009 | Lim et al. |
| 2009/0286465 | A1 | 11/2009 | Lin et al. |
| 2010/0110968 | A1 | 5/2010 | Lee et al. |
| 2010/0167743 | A1 | 7/2010 | Palanki et al. |
| 2010/0195562 | A1 | 8/2010 | Ishizu et al. |
| 2010/0317286 | A1 | 12/2010 | Jung et al. |
| 2011/0128916 | A1 | 6/2011 | Kwon et al. |
| 2011/0235514 | A1 | 9/2011 | Huang et al. |
| 2011/0249609 | A1 | 10/2011 | Brusilovsky et al. |
| 2011/0292862 | A1 | 12/2011 | Shimizu |
| 2011/0305339 | A1 | 12/2011 | Norrman et al. |
| 2012/0083202 | A1 | 4/2012 | Sawamoto |
| 2012/0106404 | A1 | 5/2012 | Damnjanovic |
| 2012/0157146 | A1 | 6/2012 | Theisen et al. |
| 2012/0281685 | A1 | 11/2012 | Kotecha et al. |
| 2013/0094486 | A1 | 4/2013 | Bhanage Gautam et al. |
| 2013/0169348 | A1 | 7/2013 | Shi |
| 2013/0201956 | A1 | 8/2013 | Cho et al. |
| 2013/0281021 | A1 | 10/2013 | Palin et al. |
| 2013/0331093 | A1 | 12/2013 | Cho et al. |
| 2013/0337872 | A1 | 12/2013 | Fertl et al. |
| 2014/0148211 | A1 | 5/2014 | Mountford et al. |
| 2014/0155019 | A1 | 6/2014 | Schwartz |
| 2014/0169262 | A1 | 6/2014 | Noh et al. |
| 2014/0220905 | A1 | 8/2014 | Buckley et al. |
| 2014/0376426 | A1 | 12/2014 | Boudreau et al. |
| 2015/0117185 | A1* | 4/2015 | Kim ................ H04W 28/0247 370/230 |
| 2016/0157076 | A1 | 6/2016 | Schwartz |
| 2016/0381725 | A1 | 12/2016 | Spinelli |
| 2017/0205812 | A1 | 7/2017 | Clayton |

FOREIGN PATENT DOCUMENTS

| | | |
|---|---|---|
| EP | 2306766 | 4/2011 |
| EP | 2442605 | 4/2012 |
| EP | 2479908 | 7/2012 |
| EP | 2496045 | 9/2012 |
| EP | 2744297 | 6/2014 |
| EP | 2763477 | 8/2014 |
| GB | 2475906 | 6/2011 |
| GB | 2503719 | 1/2014 |
| GB | 2510897 | 8/2014 |
| WO | 2003065757 | 8/2003 |
| WO | 2006138122 | 12/2006 |
| WO | 2008015562 | 2/2008 |
| WO | 2008105771 | 9/2008 |
| WO | 2008107625 | 9/2008 |
| WO | 2009097070 | 8/2009 |
| WO | 2009149023 | 12/2009 |
| WO | 2010006649 | 1/2010 |
| WO | 2010076773 | 7/2010 |
| WO | 2010151047 | 12/2010 |
| WO | 2011019976 | 2/2011 |
| WO | 2011023226 | 3/2011 |
| WO | 2011153507 | 12/2011 |
| WO | 2012015411 | 2/2012 |
| WO | 2012039656 | 3/2012 |
| WO | 2012055114 | 5/2012 |
| WO | 2013044979 | 4/2013 |
| WO | 2013130498 | 9/2013 |
| WO | 2013142361 | 9/2013 |
| WO | 2014098702 | 6/2014 |

OTHER PUBLICATIONS

European Search Report issued in EP 14382390.4 dated Apr. 17, 2015.
European Search Report issued in EP 14382497.7 dated Feb. 9, 2016.
European Search Report issued in EP 14382499.3 dated Feb. 2, 2016.
Office Action issued in U.S. Appl. No. 15/518,538 dated Mar. 12, 2018.
Office Action issued in U.S. Appl. No. 15/518,540 dated Jun. 14, 2018.
Office Action issued in U.S. Appl. No. 15/518,538 dated Jul. 10, 2018.
International Search Report and Written Opinion issued in PCT/EP2015/073353 dated Jan. 13, 2016.
International Search Report and Written Opinion issued in PCT/EP2015/073357 dated Feb. 10, 2016.
European Search Report issued in EP15382033 dated Feb. 2, 2016.
International Search Report and Written Opinion issued in PCT/EP2015/073378 dated Feb. 10, 2016.
European Search Report issued in EP14382572 dated Feb. 2, 2016.
International Search Report and Written Opinion issued in PCT/EP2015/073376 dated Feb. 10, 2016.
European Search Report issued in EP15382031 dated Feb. 2, 2016.
International Search Report and Written Opinion issued in PCT/EP2015/073388 dated Feb. 10, 2016.
International Search Report and Written Opinion issued in PCT/EP2015/073676 dated Apr. 21, 2016.

(56) References Cited

OTHER PUBLICATIONS

Partial European Search Report issued in EP14382571 dated Feb. 9, 2016.
European Search Report issued in EP15382323 dated Feb. 2, 2016.
International Search Report and Written Opinion issued in PCT/EP2015/073391 dated Feb. 2, 2016.
International Search Report and Written Opinion issued in PCT/EP2015/073399 dated Feb. 2, 2016.
European Search Report issued in EP15382400 dated Feb. 5, 2016.
International Search Report and Written Opinion issued in PCT/EP2015/073393 dated Feb. 16, 2016.
European Search Report issued in EP15382402 dated Feb. 4, 2016.
International Search Report and Written Opinion issued in PCT/EP2015/073395 dated Feb. 16, 2016.
European Search Report issued in EP15382399 dated Feb. 2, 2016.
International Search Report and Written Opinion issued in PCT/EP2015/073397 dated Feb. 10, 2016.
International Search Report and Written Opinion issued in PCT/EP2015/073402 dated Feb. 22, 2016.
International Search Report and Written Opinion issued in PCT/EP2015/073721 dated Mar. 15, 2016.
International Search Report and Written Opinion issued in PCT/EP2015/073698 dated Feb. 26, 2016.
International Search Report and Written Opinion issued in PCT/EP2015/073680 dated Mar. 23, 2016.
International Search Report and Written Opinion issued in PCT/EP2015/073713 dated Feb. 29, 2016.
International Search Report and Written Opinion issued in PCT/EP2015/073724 dated Feb. 16, 2016.
International Search Report and Written Opinion issued in PCT/EP2015/073701 dated Mar. 9, 2016.
SA3 "Living Document on Key Security Issues of Relay Node Architectures" 3GPP Draft, Jul. 5, 2010.
"3rd Generation Partnership Project: Technical Specification Group Radio Access Network; Evolved Universal Terrestrial Radio Access (E-UTRA); Relay Architectures for E-UTRA (LTE-Advanced) (Release 9)" Apr. 21, 2010.
International Search Report and Written Opinion issued in PCT/EP2015/073725 dated Mar. 22, 2016.
International Search Report and Written Opinion issued in PCT/EP2015/073708 dated Mar. 9, 2016.
International Search Report and Written Opinion issued in PCT/EP2015/068219 dated Oct. 4, 2016.

* cited by examiner

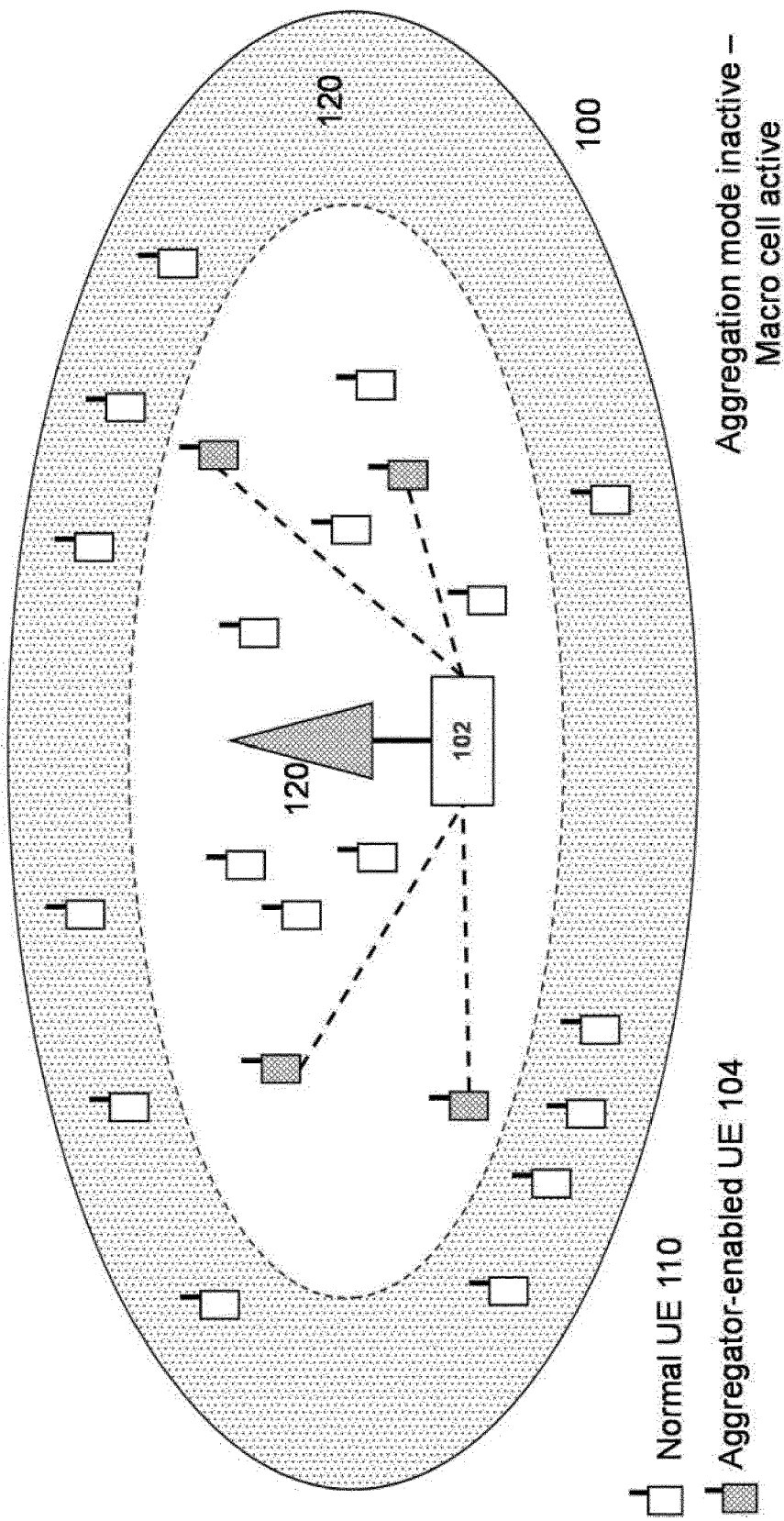

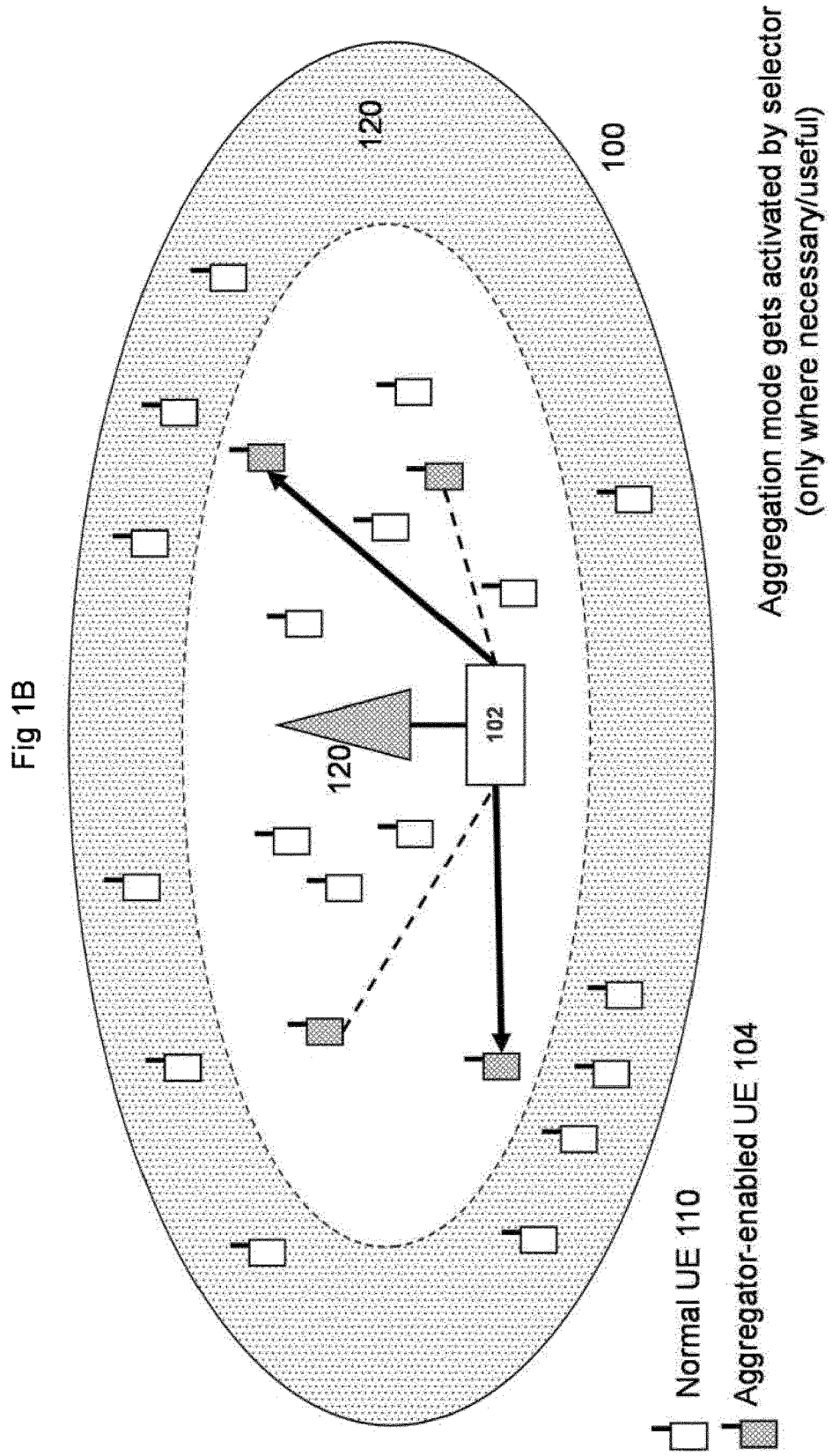

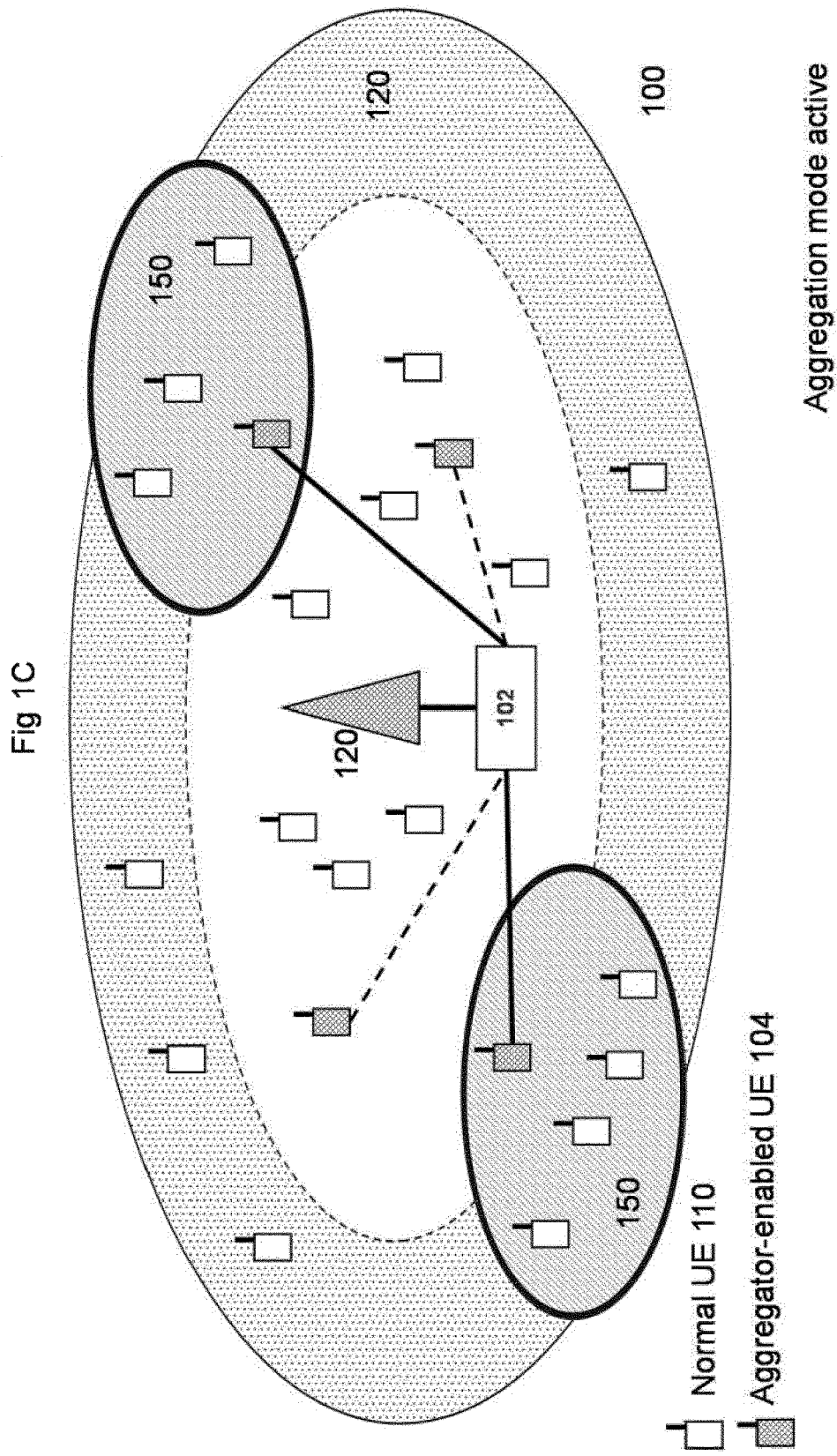

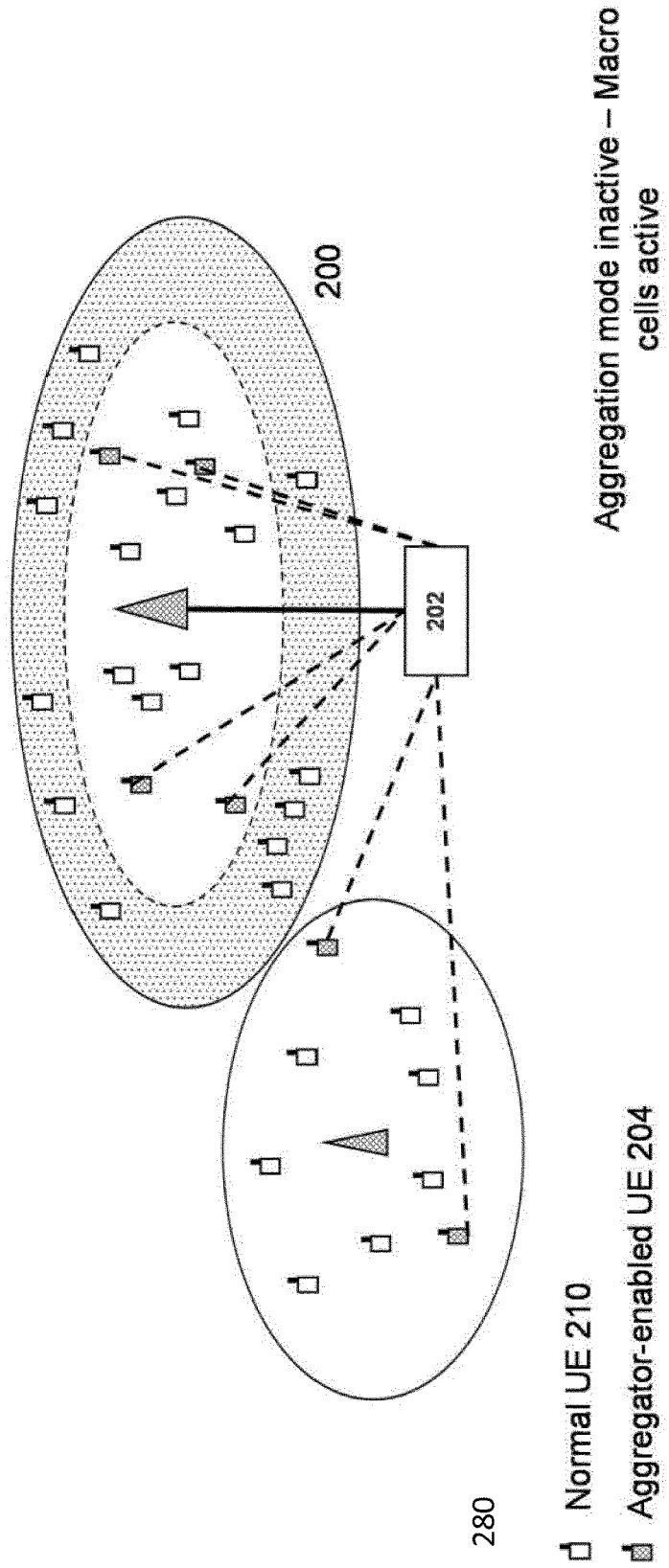

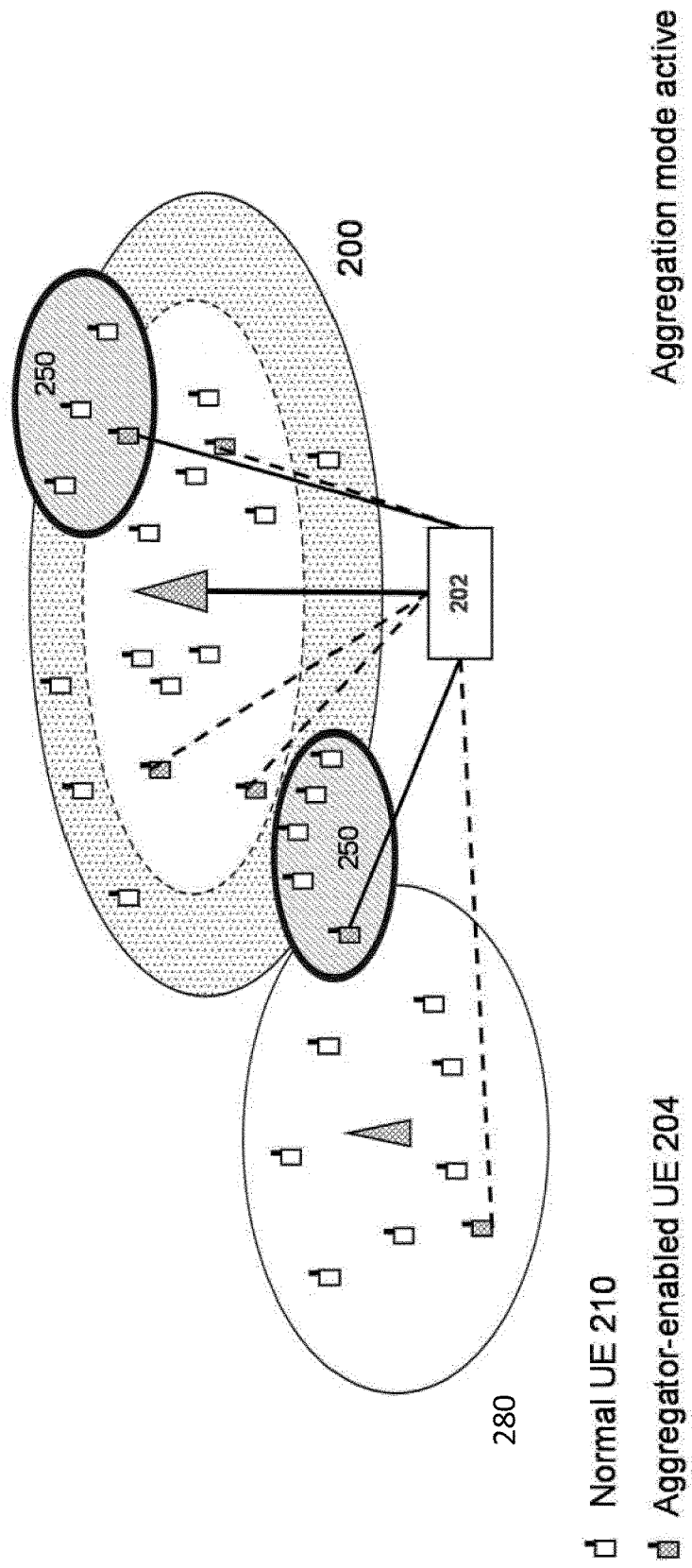

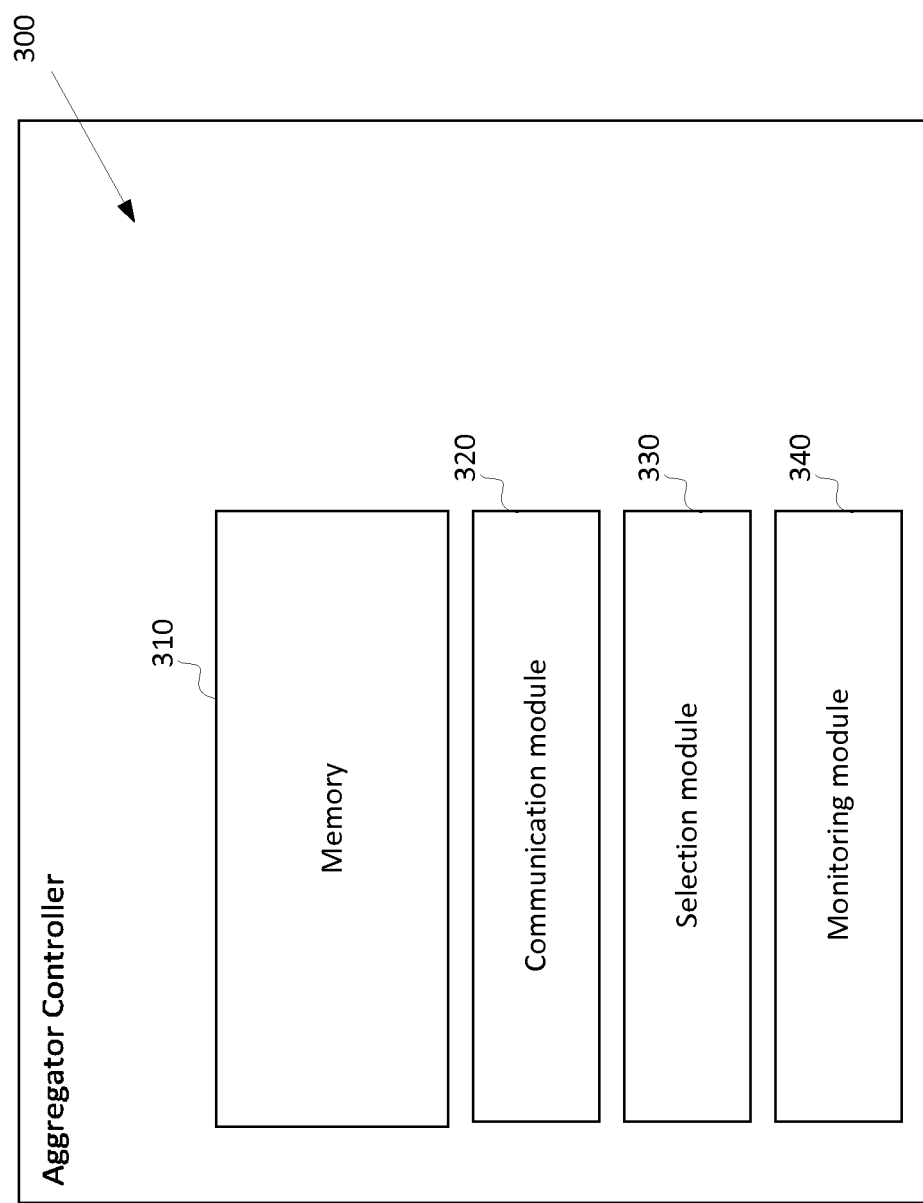

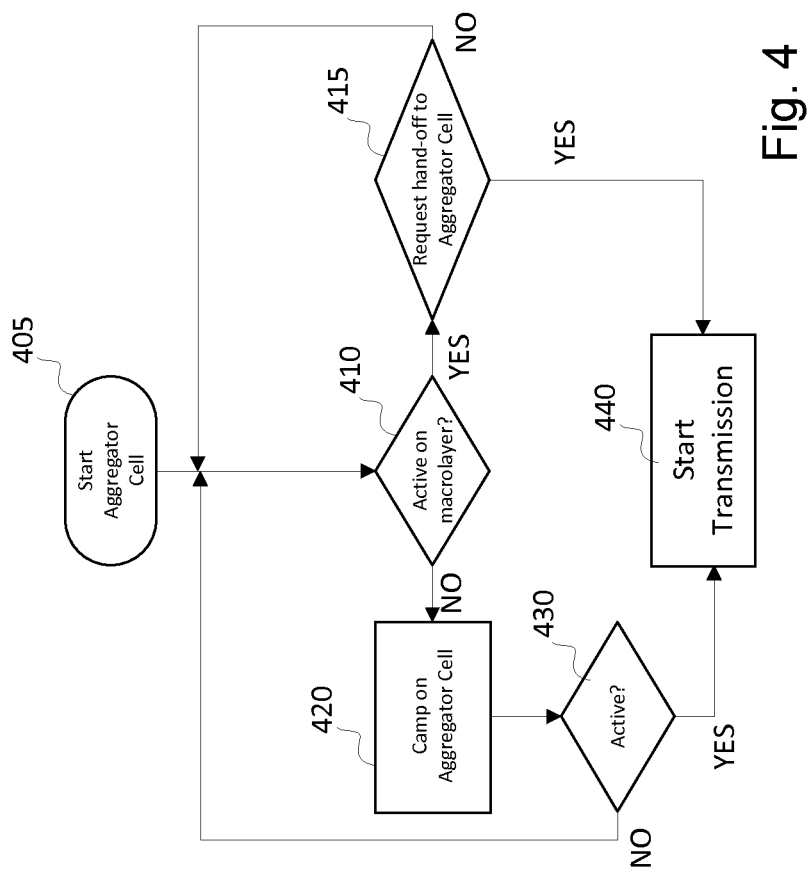

RADIO RESOURCE MANAGEMENT IN A TELECOMMUNICATION SYSTEM

CROSS REFERENCE TO RELATED APPLICATIONS

This application is a U.S. Nationalization of PCT Application Number PCT/EP2015/073360, filed on Oct. 9, 2015, which claims priority to EP Patent Application No. 14382497.7 filed on Dec. 5, 2014, EP Patent Application No. 14382499.3 filed on Dec. 5, 2014, and EP Patent Application No. 14382390.4 filed on Oct. 13, 2014, the entireties of which are incorporated herein by reference.

FIELD OF THE DISCLOSURE

This disclosure relates to radio resource management in a telecommunication system. In particular the disclosure relates to the management of radio resources in a telecommunication system that provides wireless wide area communications in cellular telecommunications networks.

BACKGROUND TO THE INVENTION

Cellular telecommunications networks characteristically provide "cells" of radio communication coverage between communication devices (which are typically mobile) and a core network (with a "downlink" from core network to communication device and an "uplink" in the opposite direction).

Various radio access technologies (RATs) are implemented: currently digital cellular networks are the most common and these are loosely classed as second generation (2G), third generation (3G), fourth generation (4G), etc. technologies according to whether the RAT achieves effective data communications that meet increasingly challenging requirements. In meeting these requirements, the technologies make different uses of the available radio frequency (RF) bandwidth: neighbouring cells in 2G technologies, for example, are deployed so that they use RF bandwidth at different frequencies to avoid interference.

To ensure effective coverage of a large geographic area, a plurality of cells are provided by respective network nodes referred to variously as base transceiver stations and base stations. Base (transceiver) stations are associated with one or more antenna arrays which in turn establish respective cells. They are controlled at least in part by other entities in the core network known as controllers (in 3G technologies such as UMTS these are referred to as radio network controllers, RNCs). More recently certain categories of base transceiver stations, referred to as eNodeBs or eNBs in the context of LTE, implement both base station functionality and at least some controller functionality. The antenna arrays (and thus, often, the base stations) are geographically distributed so that the coverage of each cell typically overlaps with that of neighbouring cells only at the cell edge. The RATs aim to ensure that communication devices are provided with continuous coverage even if they are moving from the coverage of a first cell to that of a second across the cell edge region: to do this they use a reselection technique referred to as "handover" (or "handoff"). Handoff is described as "soft" when the procedure allows for a transition period during which control and/or user data traffic intended for a given communication device is routed to the device through more than one of the cells, in other words the device is permitted to "camp" on more than one cell.

Providing communication devices with coverage at cell edge typically requires more network resources; for instance transmission power needs to be higher in the downlink in order for the RF signal to propagate to the cell edge.

Release '99 of the W-CDMA Standard enabled the reuse of the same frequency at cell edge with soft handover (i.e. handover having a transition phase where a terminal effectively camps on both source and target cells).

In later releases of 3G RATs, however, HSDPA, for instance, has mainly removed in downlink the concept of soft handover: data is transmitted from only one cell to the terminal.

In many parts of the world, 4G RATs (such those compliant with the 3GPP standards known as Long Term Evolution (LTE)) are deployed. Like these later 3G releases, LTE uses universal frequency reuse (where cells sufficiently far apart operate on the same frequency) without soft handoff. Consequently, high levels of interference and low SINR (signal to interference plus noise ratio) can be expected near the cell edge. This means users at the cell edge in LTE (and HSDPA, etc.) require more radio resources (i.e. user plane resource blocks, control channel resource blocks, etc.) than users closer to the serving base transceiver stations (i.e. eNBs). Accordingly, the potential for the cell be impacted increases when there is an increase in the number and activity of users at/near to the cell edge.

LTE is also specified to handle different types of base transceiver station entities. The requirement for cellular communications coverage is far from uniform across a typical geographic area. Furthermore natural features or features of the built environment introduce additional constraints upon the operation of base station entities.

The most prevalent class of base transceiver station is the wide area eNodeB which provides coverage over a wide geographical spread (spanning distances of up to 20 km)— this is sometimes termed the "macro (layer) eNB" type. Such eNBs often provide more than one "cell" or sector.

Base transceiver stations of more limited transmit power than the macro eNBs, and typically providing one cell or sector, are referred to as micro eNBs.

Smaller cells may be provided by devices of even lower power: local area eNBs (or picocell base stations) and home eNBs (or femtocell base stations). The resulting femtocells and picocells are sometimes referred to generally as "small cells". These classes of base transceiver stations are typically used in areas where coverage would otherwise be inadequate or awkward to maintain using conventional eNB equipment. The main distinction between local area and home eNBs is that in the case of the home eNBs the location and control of the device lies with the end-user rather than the network operator; these devices conventionally offer communication services to a "white-list" of home-users rather than any network subscribers that happen to be within coverage.

LTE has a hierarchical architecture so that a wide area layer of coverage (the macro layer) may overlap or encompass geographic regions within the coverage of smaller cells (the "micro layer"). Nevertheless there may be a preference on behalf of the network operator to have uplink and/or downlink traffic for certain devices handed down to the micro layer; to free up capacity in the macro layer for devices that are out of micro layer coverage, for example.

Network operators wish to improve the efficiency of the use of their networks at or near cell edges.

It is known to address the cell edge problem by:
Increasing the performance at cell edge, for instance by adding more and more complex software in the macrocells to improve the cell edge performance (usually within the area of the coordinated scheduling between adjacent cells). In certain cases, such as for the CoMP (Coordinated Multi Point) feature described in 3GPP Release 11, the improved cell edge performance brings with it the need for dedicated transmit (Tx) and receive (Rx) antennas associated with one or more macro eNBs.

Installing fixed Small Cells (i.e. local area eNodeBs) to increase system capacity.

The installation of fixed small cells by a network operator brings with it the burden of finding suitable locations, paying for the site rental, and deploying additional cables to connect the fixed Small Cells to other nodes of the network. Furthermore, installation and commissioning (including configuring) of fixed small cells takes time: even if wireless backhaul is used instead of cables, the fixed small cells need to be installed in a suitable position and configured for operation at that location. In some cases, this process may include the configuration and testing of directional antennas associated with such small cell devices which require the skills of a professional radio engineer. In addition, where the small cell device fails or otherwise requires servicing the device and the installation site needs to be accessible by the operator: since these devices are typically the property of the network operator but located on private land and in sometimes inaccessible locations, there are likely to be logistical and practical obstacles to intervention by one of the operator's engineers.

The LTE standards (Release 10 (and later) of the 3GPP) also describe two further Radio Access Network entities: relays and repeaters which can be used to address the problem of cell edges. Both types of entity provide extension of coverage for one cell of an existing base transceiver station.

A repeater is communicatively tied to a corresponding (typically macro) eNB, having a first antenna within a given cell (the "donor cell") of the eNB and a second antenna directed towards a coverage area where coverage extension is required. In certain instances, a repeater merely retransmits (i.e. re-broadcasts) a signal, received at a first frequency, at a second frequency, typically amplifying the repeated signal. Uplink and downlink signals may thus be conveyed through repeaters without any need for decoding.

Repeaters specified in Release 10 (and later) of the 3GPP standards decode the (incoming) signal and then recode and retransmit that signal: this new class of repeater is referred to as a "relay".

A relay is also communicatively tied to a corresponding eNB. It too has a first antenna within a given cell (the "donor cell") of the eNB and a second antenna directed towards a target coverage area. Relays however form their own cells and operate in many ways as base transceiver stations in their own right. Relays decode the signals from the donor cell, applying any necessary error correction, and make decisions about how radio resources (such as the channels within each radio subframe) are assigned.

There are certain network conditions where individual communication devices in cellular networks have a disproportionately detrimental effect on the network performance.

In certain cases, for example, one or more terminals (also termed "user equipment" or simply UE) may be close to the edge of a serving cell. A small number of active users at cell edge can consume a high number of cell resources (e.g. LTE resource blocks) since cell edge typically correlates to poor coverage; implying that a higher number of resources must be dedicated to the cell edge users to provide a throughput at a given level when compare to the demand for resources by users that are in better radio conditions (i.e. away from the cell edges). Serving radio resources to communication devices at cell-edge has a higher cost in terms of resource allocation and power usage than a similar device in a region of the cell closer to a serving base transceiver station system (such as an eNodeB).

When cellular networks are deployed, they are often specified with greater capacity than is forecast to be required by the existing communication devices. However, the numbers of communication devices and the demand for ever more network resources means that the network may be affected by capacity problems in the radio interface more often than is acceptable.

Known approaches to cell edge problems seek to increase the capacity or coverage of the cellular network by addition of further network equipment at locations in the network where cell edge problems regularly occur (or are forecast). Such equipment is typically fixed in location and requires careful planning.

Network and other performance conditions very often change over time: for instance, individual communication devices that, by virtue of their location at the cell edge and active use of the network, have a detrimental effect on the network performance at one time, may, at other times, be idle and cause no such effect. Furthermore, as UEs are typically mobile, they may have moved outside the affected cell entirely or closer to the base transceiver station equipment that serves the cell—either way, reducing the detrimental effect.

It is therefore desirable to ensure that the network can adapt to the presence of dynamic effects upon capacity and coverage and in addition to provide a system that allows the extension of coverage in a cellular network that can be deployed dynamically without requiring the siting of additional radio equipment near regions of poor radio coverage.

SUMMARY OF THE INVENTION

According to a first aspect of the present disclosure there is provided a method for determining functionality of communication devices in a cellular communication network including a plurality of communication devices, the method comprising: obtaining at least one measure of the performance of the cellular communication network in a component area of radio coverage; determining from the or each measure of performance whether performance conditions in the component area of radio coverage support the activation of an aggregator facility, said aggregator facility providing radio coverage to at least one first communication device within a selected geographical area; determining from the or each measure of performance whether a net benefit is expected for the performance of the network in the component area as a result of the activation of the aggregator facility; and controlling activation of an aggregator functionality at at least one second communication device when performance conditions in the component area of radio coverage support the activation of the aggregator facility and when a net benefit is expected.

As a result, it can be determined whether an aggregator facility (i.e. an aggregator layer), in which the radio coverage offered by the macrocell is extended by the addition of radio coverage from one or more aggregators, can and should (according to some criteria) be initiated. Each second communication device that becomes an aggregator has a functionality whereby that device may provide radio coverage in addition to that of the macrocell. This aggregator functionality may be activated as a routine within a client application executing on the communication device or as a dedicated functionality, for example.

In certain embodiments determining whether a net benefit is expected as a result of the activation of the aggregator facility may include determining whether the number of static first communication devices located in a portion of the component area within range of the at least one second communication device exceeds a threshold number.

In certain embodiments determining whether performance conditions support the activation of an aggregator facility includes determining whether network conditions necessary for the activation of an aggregator facility hold for a given component area of radio coverage; and determining whether network conditions sufficient to support the activation of an aggregator facility hold for the component area.

In certain embodiments determining whether the network conditions necessary for the activation of an aggregator facility hold includes at least one of: determining whether cell load exceeds a load threshold while throughput lies below a minimum throughput threshold; determining whether the number of users in a region of the cell exceeds a user number threshold while throughput for a given application falls below a minimum throughput threshold; determining whether a happiness metric lies below a happiness threshold; and/or determining whether the usage of control resources exceeds a control resource threshold.

In certain embodiments the network conditions sufficient for the activation of an aggregator facility depend upon the level of at least one of the following parameters: the number of communication devices in the component area of radio coverage; the number of communication devices in the component area of radio coverage having activated aggregator functionality; signal to interference plus noise ratio, SINR; path loss/received signal received power, RSRP; the available radio access technologies, operational frequency bands and/or carriers; location information of the communication devices; mobility information of the communication devices; and predicted device power profile for the at least one communication devices.

In certain embodiments the at least one second communication device is one of: a user equipment (UE); a machine type communication (MTC) device; a repeater; a relay unit; an access point; wireless station; small cell station; or a dedicated aggregator facility communication device.

In certain embodiments determining whether a net benefit is expected as a result of the activation of the aggregator facility is performed on a macrocell basis for at least one macrocell within the cellular telecommunications network.

According to a second aspect of the present disclosure, there is provided a controller entity for determining functionality of communication devices in a cellular communication network including a plurality of communication devices, the controller entity comprising a controller unit configured: to obtain at least one measure of the performance of the cellular communication network in an area of radio coverage; to determine from the or each measure of performance whether performance conditions in the area of radio coverage support the activation of an aggregator facility, said aggregator facility providing radio coverage to at least one first communication device within a selected geographical area; to determine from the or each measure of performance whether a net benefit is expected for the performance of the network in the component area as a result of the activation of the aggregator facility; and to control activation of an aggregator functionality at at least one second communication device when performance conditions in the component area of radio coverage support the activation of the aggregator facility and when a net benefit is expected.

In certain embodiments, the controller entity may be configured to determine whether a net benefit is expected as a result of the activation of the aggregator facility by determining whether the number of static first communication devices located in a portion of the component area within range of the at least one second communication device exceeds a threshold number.

In certain embodiments, the controller entity may be configured to determine whether performance conditions support the activation of an aggregator facility by determining whether network conditions necessary for the activation of an aggregator facility hold for a given component area of radio coverage; and determining whether network conditions sufficient to support the activation of an aggregator facility hold for the component area.

In certain embodiments, the controller entity may be configured to determine whether the network conditions necessary for the activation of an aggregator facility hold by performing at least one of: determining whether cell load exceeds a load threshold while throughput lies below a minimum throughput threshold; determining whether the number of users in a region of the cell exceeds a user number threshold while throughput for a given application falls below a minimum throughput threshold; determining whether a happiness metric lies below a happiness threshold; and/or determining whether the usage of control resources exceeds a control resource threshold.

In certain embodiments, the network conditions sufficient for the activation of an aggregator facility may depend upon the level of at least one of the following parameters: the number of communication devices in the component area of radio coverage; the number of communication devices in the component area of radio coverage having activated aggregator functionality; signal to interference plus noise ratio, SINR; path loss/received signal received power, RSRP; the available radio access technologies, operational frequency bands and/or carriers; location information of the communication devices; mobility information of the communication devices; and predicted device power profile for the at least one communication devices.

In certain embodiments, the at least one second communication device is one of: a user equipment (UE); a machine type communication (MTC) device; a repeater; a relay unit; an access point; wireless station; small cell station; or a dedicated aggregator facility communication device.

In certain embodiments, determining whether a net benefit is expected as a result of the activation of the aggregator facility may be performed on a macrocell basis for at least one macrocell within the cellular telecommunications network.

Another aspect of the present disclosure provides a computer program comprising instructions arranged, when executed, to implement a method in accordance with the above-described aspects.

In other arrangements of the present disclosure there is provided a method for determining functionality of communication devices in a cellular communication network including a plurality of communication devices, the plurality of communication devices including one or more candidate aggregator devices, the method comprising: obtaining information relative to candidate aggregator devices in a given area of radio coverage; for each of a plurality of subsets of the candidate aggregator devices, estimating a corresponding expected gain based on the obtained information, wherein the expected gain is a difference between an estimated value of a first measure of performance of the network after activation of an aggregator functionality in said subset of candidate aggregator devices and a first measured value of the first measure of performance of the network before activation of an aggregator functionality in any of the plurality of subsets, and wherein the aggregator functionality provides radio coverage to at least one first communication device within a selected geographical area; and activating an aggregator functionality in at least one subset selected from the plurality of subsets based at least in part on their corresponding expected gains.

In certain cases, the method may further comprise: maintaining the aggregator functionality activated in the at least one selected subset if a second measured value of the first measure of performance of the network after activation of the aggregator functionality in the at least one selected subset is higher than said first measured value.

In certain cases the method may further comprise: choosing a selection algorithm for use in selecting the at least one subset based on a type of the obtained information.

In certain cases, the expected gain for each subset is estimated by: obtaining the first measured value by measuring said first measure of performance of the network before activation of an aggregator functionality in any of the plurality of subsets; and for each candidate aggregator device in the subset, calculating the estimated value of the first measure of performance of the network for a case where the device provides an active aggregator functionality, and calculating a difference between the estimated value and the first measured value of the first measure.

Alternatively, the expected gain for each subset is estimated by, obtaining the first measured value by measuring said first measure of performance of the network before activation of an aggregator functionality in any of the plurality of subsets; and for each subset, calculating the estimated value of the first measure of performance of the network for a case where each of the devices in the subset provides an active aggregator functionality, and calculating a difference between the estimated value and the first measured value of the first measure.

In certain cases, the subset in which the aggregator functionality is activated is selected by: evaluating the expected gain for each subset; and selecting a subset having a required expected gain. Here, the evaluation of the expected gain may comprise calculating which of the at least one subsets provides the greatest expected gain, and wherein the selection of the subset having the required expected gain comprises selecting the subset that provides the greatest expected gain.

Alternatively, the evaluation of the expected gain may comprise calculating which of the subsets requires fewest changes in aggregator devices from the aggregator devices currently providing the aggregator functionality, and wherein the selection of the subset having the required expected gain comprises selecting the subset that requires fewest changes in aggregator devices, the estimated expected gain exceeding a threshold gain value.

In a further case, the evaluation of the estimated expected gain may comprise modelling performance of the network with the selected subset activated and comparing that modelled performance information to the measured performance of the network before activation of an aggregator functionality.

In certain cases, if the second measured value of the first measure of performance of the network does not exceed the first measured value, the method may further include: controlling the or each candidate aggregator device having an active aggregator functionality to deactivate the aggregator functionality.

In certain cases, activating the aggregator functionality in the at least one selected subset may include, for the or each candidate aggregator device in the selected subset, controlling the respective device to activate the active aggregator functionality.

In certain cases, the method may further comprise obtaining a third measured value of a second measure of performance of the network before activation of an aggregator functionality in any of the plurality of subsets; and maintaining the aggregator functionality activated in the at least one selected subset if a fourth measured value of the second measure of performance of the network after activation of the aggregator functionality in the at least one selected subset is higher than the third measured value.

In such cases, the second measure of performance used in determining whether to maintain an already active aggregator functionality may thus differ from the first measure used to determine whether the aggregator functionality should be activated in the first instance.

In certain cases, the method may further comprise updating the selection of candidate aggregator devices, at spaced-apart intervals of time, by: obtaining a further measured value of the measure of performance of the network; for each subset of the candidate aggregator devices, estimating an updated corresponding expected gain; selecting at least one of the subsets based at least in part upon their corresponding updated expected gain; activating an aggregator functionality in each selected subset; and maintaining the active aggregator functionality if the further measured value of the measure of performance of the network exceeds a reference value of said measure. Here the method may further comprise, before estimating the updated expected gain, changing the configuration of the active aggregator functionality in response to the further performance information.

In certain cases, the reference value may be a value of said measure averaged over a plurality of historical measurements. Alternatively, the reference measured value may be a value of said measure selected from any one of N further measured values of said measure obtained in the N most recent update operations.

In certain cases, each candidate aggregator device may be a communication device that fulfils at least one criterion selected from: sufficient battery life; location within a portion of the given area of radio coverage for which the aggregator functionality is expected to be required; and current path loss metric for the communication link between the communication device and the cellular communication network falls below a path loss threshold.

Examples of communication device may include one of a user equipment (UE); a machine type communication (MTC) device; an access point; wireless station; and/or small cell station.

In respective cases, the given area of radio coverage may be selected from: a macrocell coverage area for at least one macrocell within the cellular telecommunications network; a coverage area for at least one sector within the macrolayer of the cellular telecommunications network; and the coverage area of the entire cellular telecommunications network.

In yet another arrangement of the present disclosure, there is provided a method for determining functionality of communication devices in a cellular communication network including a plurality of communication devices, the plurality of communication devices including one or more candidate aggregator devices, the method comprising, at spaced-apart intervals of time: estimating an expected gain for each of a plurality of subsets of the candidate aggregator devices, the estimate being based on information relative to candidate aggregator devices in a given area of radio coverage, wherein the expected gain is a difference between an estimated value of a measure of performance of the network after activation of an aggregator functionality in said subset of candidate aggregator devices and a current measured value of the measure of performance of the network, and wherein the aggregator functionality provides radio coverage to at least one first communication device within a selected geographical area; activating an aggregator functionality in at least one subset selected from the plurality of subsets based at least in part on their corresponding expected gains; and maintaining the activated aggregator functionality in the at least one selected subset if the current value of the measure of performance of the network exceeds a reference value of said measure.

The above aspects may be implemented within a system for providing an aggregator facility in a telecommunications network; the system comprising: a core network, CN; and a radio access network, RAN, which is configured to provide a backhaul connection to the CN and to provide wireless communication connections to radio communication devices; wherein the system further comprises: a first communication device, the first communication device having a first connection to the CN, the first connection path including a wireless connection between the RAN and the first communication device; a second communication device; and an aggregator controller, which communicates with the RAN and the CN and which is configured to instruct the second communication device to establish an aggregation connection to the first communication device and a second connection between the first communication device and the CN, wherein the second connection included the aggregation connection and the instruction is dependent upon performance conditions.

The second connection may be used instead of the first connection to the CN; alternatively the second connection may be used in addition to the first connection to the CN.

In certain embodiments, the aggregation connection is a wireless connection.

In certain embodiments there are a plurality of first communication devices. Where there are more than one first communication device, the aggregation connection transports aggregated data from the first communication devices, the data from each first communication device being packetized for backhaul to the core network.

In certain embodiments, the second communication device may be a user equipment (UE) whose user has indicated that the UE may be dynamically assigned to act as an "aggregator".

In certain embodiments, the second connection further includes a second wireless connection to the RAN and the backhaul connection from the RAN to the CN. Where the second communication device is a user equipment (UE), the second wireless connection may be established using a SIM card specific to that device to authenticate the device to the CN.

In certain alternative embodiments, the second connection further includes a connection using at least one connection technology selected from: optical fibre cable technologies; Ethernet technologies; a fixed line xDSL technology; microwave backhaul technology; and/or a Wi-Fi technology. In the case of Wi-Fi technology, the connection may thus comprise a Wi-Fi section from second communication device to a Wi-Fi access point and a fixed line section from the Wi-Fi access point to the core network. Fixed line xDSL and optical fibre connections may be either direct or indirect; in the indirect case, the connection may be established via at least one intervening network entity.

In certain embodiments, the second communication device may be a dedicated communication device specifically deployed to act as an aggregator. Alternatively or additionally, the second communication device may be a small cell base transceiver station, for example, a home eNodeB (HeNB).

In certain embodiments, the aggregator controller is independent of the RAN. The controlling functionality (which could be implemented, for example, as a software) is thus placed in an entity that is typically external to the eNodeBs. This external entity is configured to establish a communication channel with selected terminals (or other communication devices) that are capable of acting as aggregators for other terminals in the network. When each of these selected terminals acts as aggregators for one or more other terminals in the network, the latter are connected to the CN via a secondary connection which is different from the primary connection they would have when connected with the CN via the RAN. These connections are primarily logical connections between the terminals and the CN. The secondary connection will include a communication channel between the selected terminal and the one or more other terminals in the network for which the selected terminal acts as an aggregator (hereafter, we will call the selected terminal "aggregator"). The aggregator will communicate with each of these other terminals and combine their communication streams before they are transmitted to the Core Network. In certain cases, the external entity is configured to establish further parallel communication channels with other communication devices: this may be useful when determining the locations of communication devices more generally rather than candidate aggregators alone, as may be needed in certain embodiments.

As a result, the system may be deployed without requiring bespoke adaptations of otherwise conventional eNodeBs to include dedicated software functionalities. The introduction of a separate controller entity means that the system may be implemented in association with any conventional macrocell layer deployment.

Furthermore the system requires neither changes in network architecture nor new stricter requirements in synchronization, backhaul, etc.

As a user may obtain (and to some extent control the positioning of) candidate aggregators, the users of the network may also benefit in that they are able to influence the overall coverage of the macrolayer by their own actions.

In certain embodiments, the performance conditions upon which the instruction to the second communication device to establish the second connection depends include a metric of coverage quality and/or usage of resources in the network being greater than a threshold level. This metric may be a metric of a level of interference in the network. In particular, this level of interference may be one due to the use of the first connection. The threshold level is an estimate (which can be predetermined) of a level of interference due to the use of the second connection.

In certain embodiments, the instruction to establish an aggregation connection may be conditional upon performance conditions associated with the second communication device. This may be in addition to the metric discussed above. The performance conditions associated with the second communication device may include parameters associated with the connection between the second communication device and the RAN. The performance conditions associated with the second communication device may include at least one of SINR, received signal received power (RSRP), location information, and battery life.

In certain embodiments, the aggregator controller may be further configured to process the performance conditions associated with the second communication device and, only if the parameters are determined to indicate that the second communication device is a candidate for assignment as an aggregator, to instruct the second communication device to establish the aggregation connection to the first communication device In addition, the above aspects may be implemented within a controller entity for controlling an aggregator facility in a cellular telecommunication network, wherein the network has a core network, CN, and a radio access network, RAN, and serves at least one first communication device, the controller entity comprising a network interface unit configured to provide an interface to the CN and controller unit configured: to obtain performance condition information for a region of the telecommunication network, to determine whether a second communication device provides aggregator functionality to said at least one first communication device, and to instruct the second communication device to establish an aggregation connection to the first communication device in dependence upon the determination.

In certain embodiments, the performance conditions include conditions associated with a communication link between the or each first communication device and an eNB in the RAN, and the controller unit is configured to determine whether a second communication device provides aggregator functionality by determining whether the performance conditions match trigger conditions.

In certain embodiments, the controller unit is configured to instruct the second communication device to establish an aggregation connection by assigning a second communication device to operate in the aggregator mode, upon receipt of an indication that performance conditions match the trigger conditions, and commanding the first communication device to switch at least a portion of its data link from the eNB to the second communication device in aggregator mode, wherein aggregator mode is a mode in which the second communication device is configured to aggregate data traffic from one or more of said first communication devices.

In certain embodiments, the performance conditions include conditions related to the location of one or more second communication device and the controller unit is further configured to obtain performance condition information repeatedly at time intervals and to determine whether a second communication device provides aggregator functionality on successive occasions in dependence upon the performance condition information thus obtained, thereby updating the determination. In certain embodiments, the conditions related to the location of one or more second communication device indicate whether each second communication device is static for a duration sufficient to allow effective aggregator functionality.

In certain embodiments, the controller unit is configured to activate the network interface unit in dependence upon the performance condition information, thereby activating an aggregator layer in the telecommunication network. In certain embodiments, the processing means is configured to deactivate the network interface unit in dependence upon the performance condition information, thereby deactivating an aggregator layer in the telecommunication network.

In certain embodiments, the performance condition information includes location information for the at least one first communication device and the controller unit is further configured to determine whether a second communication device provides aggregator functionality in dependence upon the location information for the at least one first communication device.

In certain embodiments, the controller entity corresponds to the aggregator controller in the system described above and may implement any of the functionalities of the aggregator controller in the system described above.

Use of a separate controller entity means that dynamically configured communication devices need not be rigidly addressed through the hierarchical structures of the radio access network and/or the core network. Communication devices in regions of the network architecture governed by different radio network controllers or eNodeBs may be dynamically controlled together to offer a more responsive overall coverage to other communication devices. Coverage extension may more easily transcend the region (i.e. sectors or cells) in which the controlled communication devices currently operate.

Furthermore the separation of the controller entity from the core and radio networks means that the controller entity may be implemented in association with any conventional macrocell layer deployment.

There is further provided computer software operable, when executed on a computing device, to cause one or more processors to perform a computer implemented method according to the above aspects of the present disclosure.

A further aspect provides machine-readable storage storing such a program.

Various respective aspects and features of the present disclosure are defined in the appended claims.

It is an aim of certain embodiments of the present disclosure to solve, mitigate or obviate, at least partly, at least one of the problems and/or disadvantages associated with the prior art. Certain embodiments aim to provide at least one of the advantages described below.

BRIEF DESCRIPTION OF THE DRAWINGS

Various embodiments of the present disclosure will now be described with reference to the accompanying drawings, in which:

FIGS. 1A to 1C illustrate a radio access network where certain communication devices are dynamically assigned as aggregators within a single cell;

FIGS. 2A and 2B illustrate a further radio access network where certain communication devices are dynamically assigned as aggregators within a multicell network;

FIG. 3 illustrates the functional elements of an aggregator controller suitable for enabling, controlling and disabling an aggregator layer in the network architecture of FIGS. 1A, 1B, 10, 2A and 2B;

FIG. 4 illustrates the behaviour of nearby communication devices when the aggregator controller of FIG. 3 enables an aggregator layer at a given aggregator;

DETAILED DESCRIPTION OF PREFERRED EMBODIMENTS

Figure 5:
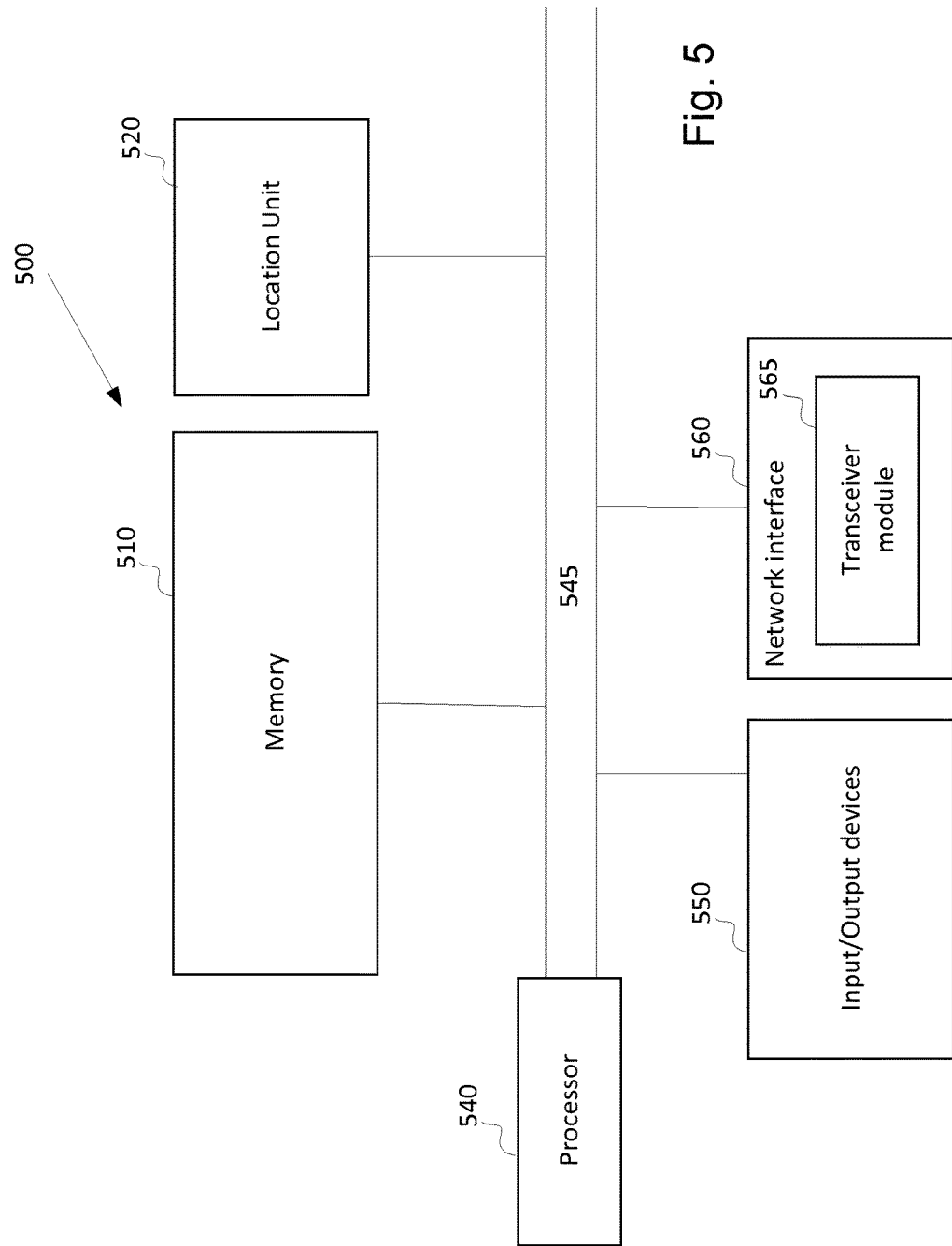
FIG. 5 illustrates the functional elements of a communication device suitable for use in the network architecture of FIGS. 1A, 1B, 10, 2A and 2B.

The present disclosure relates to methods of radio resource management in a telecommunications network architecture that includes a radio access network (RAN), a core network (CN) and a packet data network (PDN). Communication devices, such as mobile terminals, user equipment (UEs) and wireless access stations, establish wireless connections to the network by means of the RAN.

FIGS. 1A to 10 show a single cell 100 of the telecommunications network provided by a base transceiver station (i.e. macro eNB) 120 within the RAN. The telecommunications network architecture further comprises a network node, referred to as an aggregator controller (AC) 102, which communicates with the RAN and the CN (illustrated here as a link between the AC 102 and the eNB 120) but which may be implemented independently of the component entities of either RAN or CN.

The AC 102 identifies at least one communication device 104 as candidate for assignment as an aggregator. The AC 102 also instructs any given aggregator candidate 104 to activate (or deactivate) an aggregator mode, whereby it provides base station functionality for nearby (mobile) communication devices 110. The AC 102 also determines whether any aggregator candidate 104 is activated at all at a given time in a given region of the telecommunications network. In FIGS. 1A to 10, candidate aggregators 104 are illustrated as UEs: this is merely one example of a suitable communication devices 104, candidate aggregators may equally be dedicated communication devices or even small cell base transceiver stations such as HeNBs or femtocell eNBs.

The AC 102 is configured to interrogate one or more communication devices 104, where these devices are connected to the RAN (i.e. the eNB 120), to determine certain parameters associated with the device 104 and/or its connection to the RAN (e.g. SINR, reference signal received power (RSRP), receive signal code power (RSCP), location information, battery life, etc.). Data associated with the parameters is processed at the AC 102 and, if the parameters are determined to indicate that the or each communication device 104 is a candidate for assignment as an aggregator, the communication device 104 may be configured to implement an aggregator mode, whereby it provides base station functionality for nearby (mobile) communication devices 110.

FIGS. 1A to 1C also illustrate one scenario where the facility extending base station functionality to nearby (mobile) communication devices 110 is contemplated. As communication devices approach the furthest range of macrocell coverage in the cell (i.e. the cell edge), they consume more network resource. By selecting certain communication devices to act as aggregators, these devices being within good macrocell coverage but having the facility to extend base station functionality within an "aggregator cell" beyond the coverage of the macrocell layer, the network can deploy aggregators to address the problems of cell edge.

Certain network-connected communication devices 104 are thus used as a type of small cell entity. Network-connected communication devices assigned to perform this small cell-like functionality are termed "aggregators" because, where there are more than one communication devices 110 nearby a given network-connected communication device 104 in aggregator mode, the data traffic from the nearby communication devices 110, for each of the nearby communication devices 110, is buffered for transport (i.e. "aggregated") using a backhaul connection between the aggregator 104 and the core network. By aggregating the data from one or more nearby communication devices 110, the aggregator can both (a) assist in extending the network coverage to locations where (i) the macrolayer coverage is otherwise either temporarily or permanently inadequate or (ii) the macrolayer coverage is adequate but devices within a certain coverage area (e.g., cell edge) consume too many resources and (b) transport data over the RAN more efficiently. One of the advantages of buffering data from the nearby communication devices 110 is that the backhaul connection from the aggregator 104 (which may be considered as a single logical "pipe") can be made less "bursty" reducing signal resource consumption.

Aggregators are typically, dynamically switched-on and off in dependence upon conditions affecting the performance of the network. These performance conditions include both network conditions (such as interference, load, etc.) and other conditions that could affect the performance of the system (such as the predicted level of activity in the cell at a given time or date, the presence and/or number of candidate aggregators in suitable locations, the distribution of UEs in cell edge locations, and/or the level of resource consumption by communication devices in the potential coverage area of respective candidate aggregators).

In certain cases, the coverage of the existing macrolayer is used for backhaul and a technology/band different from the one used for the backhaul is used as a radio interface for extending the coverage to nearby (mobile) communication devices 110. The coverage extension is therefore supplied to nearby communication devices 110 by aggregators operating "out-of-band" with respect to the macrolayer operating frequencies.

In one example, the macrolayer operates using LTE carriers at frequency bands around 800 MHz or 1800 MHz while the cell provided by the aggregator to nearby communication devices operates at 2600 MHz. In another example, the macrolayer operates using LTE carriers at frequency bands around 2600 MHz using an FDD technology while the cell extension provided by the aggregator to nearby communication devices operates at 2600 MHz in a TDD technology. Furthermore, the reader will appreciate that further out-of-band frequency bands may be available at frequencies for which no license is needed, such as the 2.4 GHz and 5 GHz bands used by conventional WiFi technologies (i.e. compliant with the IEEE 802.11 family of standards).

It will be appreciated that in many instances aggregators (and candidate aggregators) are themselves mobile. While in certain embodiments, it is a requirement that the aggregator is static when active, it is also contemplated that the aggregator may be moved to another site and activated at the new site—such communication devices are referred to as "nomadic", as distinct from "fixed" devices. One specific example of a nomadic device arises when the candidate aggregator is installed in a motor vehicle, such as a commuter's car: the vehicle is driven from a home location (where it may be static) to an office location (where, after the journey is complete, the device may again be unmoved throughout the working day).

The AC 102 is a central logical entity (e.g. a server), which may or may not be integrated within the elements of the 3GPP Radio Access Network. The AC 102 monitors conditions affecting the performance of the network to assist in deciding which UEs 104 (or other network-connected communication devices) will act as aggregator.

Certain implementations of the AC 102 obtain information from all network-connected communication devices in a given sector before determining which of these devices can act as aggregators by virtue of the device status and current location. This determination is repeated for respective sectors at intervals of time: in certain cases, the intervals are equal in duration, while in others, the intervals are of variable duration and may be adapted to the known or predicted behaviour of communication devices using the network.

The AC may further repeatedly determine whether, on a set of basic criteria (i.e. performance conditions such as the network conditions, the current location and status of communication devices, etc.), any devices in a given sector should enter into service as aggregators at all. The criteria may include a measure of the comparative benefit of introducing an aggregator facility compared to having no aggregator facility in a given sector.

The AC is capable of establishing, maintaining and deactivating communications with the candidate aggregators, i.e. those UEs or other network-connected communication devices determined to have the capability to act as aggregators. This capability (provided through an application layer carried over the user plane of the macro layer, for example) allows the AC to:

- obtain information from all the UEs that can act as aggregators 104, this information may include performance factors such as location and its accuracy, supported RATs and related technologies (such as conventional WiFi technologies), supported operational frequency bands, battery characteristics, status, and current battery drain consumption; and/or
- provide commands to the aggregators 104 such as: commands to set-up an aggregator control layer using some specific algorithm depending upon performance conditions such as those obtained from the aggregators 104, to select the RAT/band to be used in such a layer, to start transmission, to send handover commands to the aggregated UEs (i.e. the nearby communication devices 110 served by the aggregators 104), to stop transmission, and/or to send information to the aggregator control layer.

In certain implementations, the AC 102 might communicate with the LTE eNodeB or 3G RNC in order to "move", via handover to a specific RAT/frequency, a terminal (or other communication device) that is set to act as an aggregator 104. This move may be a change in serving cells: in such cases the communication with the LTE eNodeB or RNC is a request for a handover of the aggregator 104 from a current cell to a neighbouring cell: communication with the eNodeB or RNC is necessary then since handovers are under the control of the LTE eNode (for 3G, the control is done by the RNC). The move might also be a forced reselection: in which case communication with the LTE eNodeB would be unnecessary.

In certain implementations, the AC 102 may establish a further direct communication with "normal" UEs 110 (i.e. those communication devices not currently assigned to act as aggregators). This direct communication may be through a preinstalled application, for instance, configured to gather further performance information such as the strength/quality of received signals in the cell 100 in which the normal UEs 110 are camped/connected, and/or data on the strength/quality of received signals in other RATs/band, and/or location information.

In certain implementations, the aggregation enabled communication devices 104 (i.e. aggregators or candidate devices) are also relay nodes. Such devices may transfer data for one group of network-attached communication devices as a conventional relay node, while serving another group of network-attached communication devices as an aggregator.

The aggregator 104 is distinct from a typical relay node in a number of respects. Firstly, relay nodes are tied to a particular donor cell. They are presumed to be static and entirely under the control of the network operator via the eNB providing the donor cell. Furthermore, relay nodes are typically operated using radio resources allocated to them by the donor cell and are thus integrated in the scheduling for the macrocell. In logical terms, a connection from a communication device to the core network via a relay node is the same logical connection as that between the communication device and the core network via the donor eNB: resource that would be allocated within the macrolayer for the direct connection from communication device to eNodeB is instead allocated to the indirect connection via the relay unit.

The macrolayer (i.e. provided by eNB 120) and the aggregator 104 provide separate logical connections between the Core Network and communication device 110, with the aggregator 104 being "configurable" to provide this connection. Whereas the relay node provides an alternative physical route provided the communication device camps on the relay cell rather than the donor cell, the AC 102 ensures that the network can control whether a given candidate (or group of candidates) for aggregator is enabled (i.e. enters into service as an aggregator) and thus determines the conditions under which the communication device switches between a connection established by the RAN and a connection established by the aggregator (when instantiated).

FIGS. 2A and 2B illustrate a further radio access network where certain communication devices are dynamically assigned as aggregators within a multicell network. This scenario demonstrates that the aggregator is not however merely a "temporary" base transceiver station. As the aggregator is activated and deactivated ad hoc (i.e. opportunistically) based on the need of the RAN as a whole, it is contemplated that certain communication devices 204 camped on neighbouring cells 280 could be assigned aggregator status.

Such aggregators 204 can be arranged to provide more effective base station functionality to communication devices in the cell 200 currently serving a conventional communication device 210. While that aggregator 204 would normally be outside the reach of the serving cell 200, it can nevertheless be activated, via the AC 202.

As the AC 202 need not be associated specifically with a given cell 200, but rather with a network that may include a plurality of cells (200, 280), the AC 202 is adapted to view the network holistically. By activating aggregator facilities 204 that sit outside the (macrolayer) coverage of a cell 200 yet still serving communication devices 210 within that cell 200, the AC 202 may still deliver an overall benefit to the network.

FIG. 3 illustrates the functional elements of an aggregator controller 300 suitable for enabling, controlling and disabling an aggregator layer in the network architecture of FIG. 1A, 1B, 1C, 2A or 2B. These functional elements may be implemented as software routines and/or as dedicated hardware units, these elements being substantially interchangeable.

The functional elements include a communication module 320 for obtaining information from potential aggregators by establishing communication via an application layer with these devices. The information obtained contributes to the factors affecting the performance of the network upon which the establishment of a connection between aggregators and nearby communication devices depends and may include: current location (e.g. location information derived from satellite positioning systems, such as Global Positioning Satellite, GPS); historical information (covering, for example, the last two weeks) of the location of the candidate aggregator; level of physical mobility at present (i.e. whether moving or not); a measure of LTE radio coverage in the macrolayer; an indicator of battery level, current consumption, expected remaining battery etc.; information concerning neighbour cells of the aggregator, in respect of the connection between the aggregator and the macrolayer RAN; and a measure of the improvements (or otherwise) expected, after switching on an aggregator layer in a specific region of the radio network, the improvements being measured in terms of latency (i.e. data waiting time), for example. This information may be made available in the application layer through an aggregator client application executing on the respective aggregator candidate devices.

One reason for obtaining such information relates to the nature of the devices that are candidates. It is likely that many of the candidate aggregators are in fact "nomadic", changing (i.e. commuting) between two or more static locations over a period of hours or days. Thus for many candidate devices the characteristics of the network will change as they move within the network: a communication device that is a suitable candidate aggregator at a given location, X, and a given time, T, may not be suitable elsewhere, X+x, at a later instant, T+t: specifically if the location is close enough to extend an aggregator cell to the (macrolayer) cell edge at T, but out of range of the cell edge at T+t. Thus the controller 300 needs to obtain this information to inform decisions as to whether the communication device is (currently) a candidate aggregator and whether, if a candidate aggregator, it should be activated/deactivated as an aggregator.

Optionally, the communication module 320 may be configured to obtain additional information from communication devices other than aggregators; this additional information being analogous to the information obtained from candidate aggregators and similarly contributing to the factors affecting the performance of the network upon which the establishment of a connection between aggregators and nearby communication devices depends. A specific non-aggregator client application may be installed in some or all of the communication devices within a network to provide this additional information.

The communication module 320 may also be configured to obtain macrolayer information (i.e. data concerning network conditions) from the macrolayer concerning the current level of resource consumption of the schedulers, coverage maps and (if available) real time traffic maps.

The functional elements include a selection module 330 for selecting (and communicating to) the aggregators that have to start the transmission of an aggregator cell and for determining which of the supported technology/frequency bands the selected aggregators is to use in operation.

A monitoring module 340 is also provided to evaluate performance conditions (such as the network conditions and other conditions affecting performance) to determine which of the currently selected aggregators will continue their transmission.

In cases where a change in aggregator is indicated by the monitoring module 340, the selection module 330 may be further configured to select (and communicate to) those aggregators which should stop their transmission (and thereby cease to be in service as an aggregator).

When enabling an aggregator layer in a given sector or cell of a radio network, the aggregator controller first instructs one or more communication devices (preselected to act as aggregators) to start radiating coverage (i.e. to implement an aggregator "cell").

In FIG. 4, the activity of communication devices nearby an active aggregator are illustrated. Once a given aggregator starts radiating coverage to its own cell 405, the behaviour of nearby communication devices adapts accordingly.

Nearby communication devices (i.e. terminals, such as UEs) that are in idle mode will automatically camp on the newly established aggregator cell 420 (by virtue of the conventional idle mode reselection of the cell with the strongest signal strength coupled with the prioritization of LTE layers broadcast by the LTE eNodeB). If the nearby idle device thereafter enters an active mode 430, transmission starts (or does not start) over the aggregator cell 440. Where there is an ongoing existing connection through the macrolayer of the RAN (i.e. it is determined that the nearby communication device is active on the macrolayer) 410, the RAN may optionally, upon request from the aggregator controller, move (i.e. hand-off) the ongoing communication of the respective nearby device towards the aggregator cell 415. If such a request is made, transmission starts (or proceeds) over the aggregator cell 440.

FIG. 5 illustrates the functional elements of a communication device 500 suitable for use as an aggregator in the network architecture of FIG. 1A, 1B, 10, 2A or 2B.

The communication device 500 includes a memory 510, location unit 520, a processor 540, input/output devices 550 and a network interface unit 560 having a transceiver module 565. Data is transferred between the various components via a bus 545. To operate as an aggregator, the network interface unit 560, through its transceiver module 545 must be capable of establishing two separate network interfaces: a backhaul interface and a coverage extension interface. In certain implementations, the transceiver module operates in at least two sets of frequency bands: one set of bands that correspond to the RAT of the macrolayer and a further "out-of-band" set of frequencies not used by the RAT. In some cases, communications on the "out-of-band" set of frequencies use a different RAT from the macrolayer.

In certain implementations, the backhaul and the coverage extension interface might use the same working frequency/RAT as a conventional relay node in order to facilitate the deployment of multi-hop scenarios, in which chains of Radio Access Network entities are deployed. For example, a first aggregator may appear to other communication devices as a Donor eNodeB and a second aggregator may appear to the first aggregator as a conventional UE while providing its own cell to nearby communication devices appearing to them as a conventional Relay Node.

The location unit 520 may include a global positioning satellite (GPS) unit or the like to provide location information for the communication unit 500 as well as cell synchronization if other methods are not available.

While not shown, the communication device 500 may be powered from a battery—such as a rechargeable Li-ion battery, conventional in the field of portable cellular communication devices, such as smartphones.

Even if conditions exist that suggest it would be possible to deploy one or more aggregation layer in a cellular communication network, there must be a good reason to decide to set-up an aggregator layer: in essence there needs to be some tangible expected benefit in doing so rather than persist with the normal macrolayer operation.

Figure 6A:
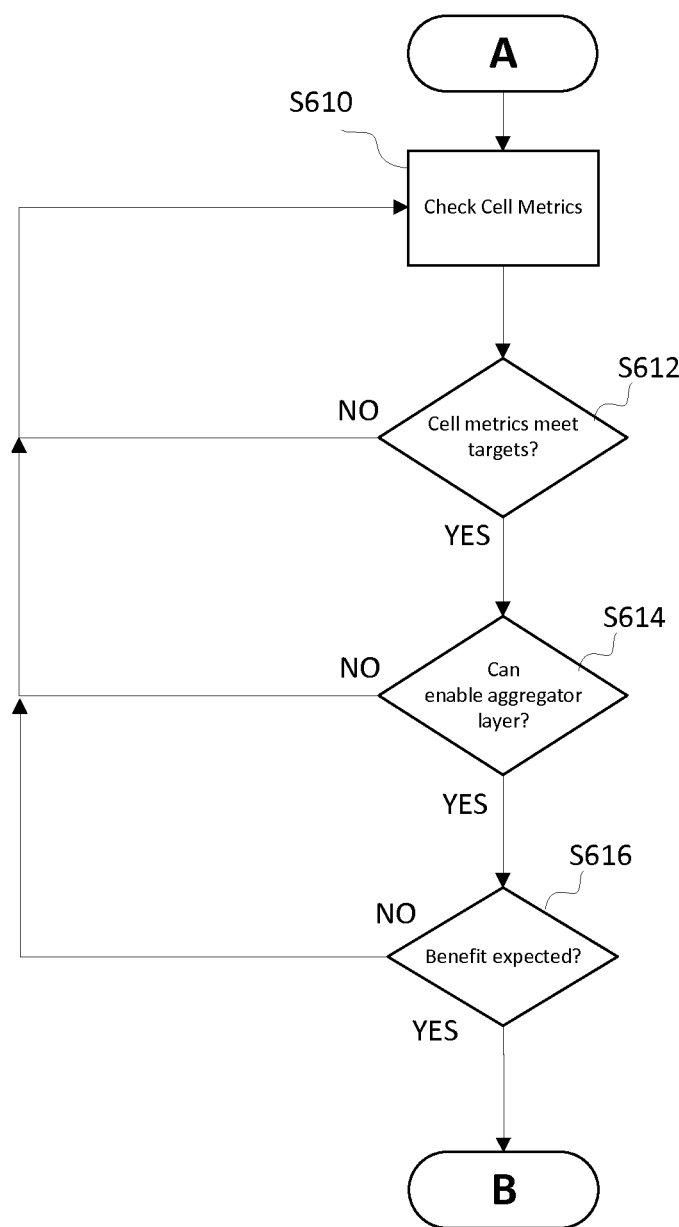
FIGS. 6A and 6B show a flowchart illustrating exemplary operations of a method for determining activation of an aggregator facility (or "layer") in accordance with the present disclosure.
Figure 6B:
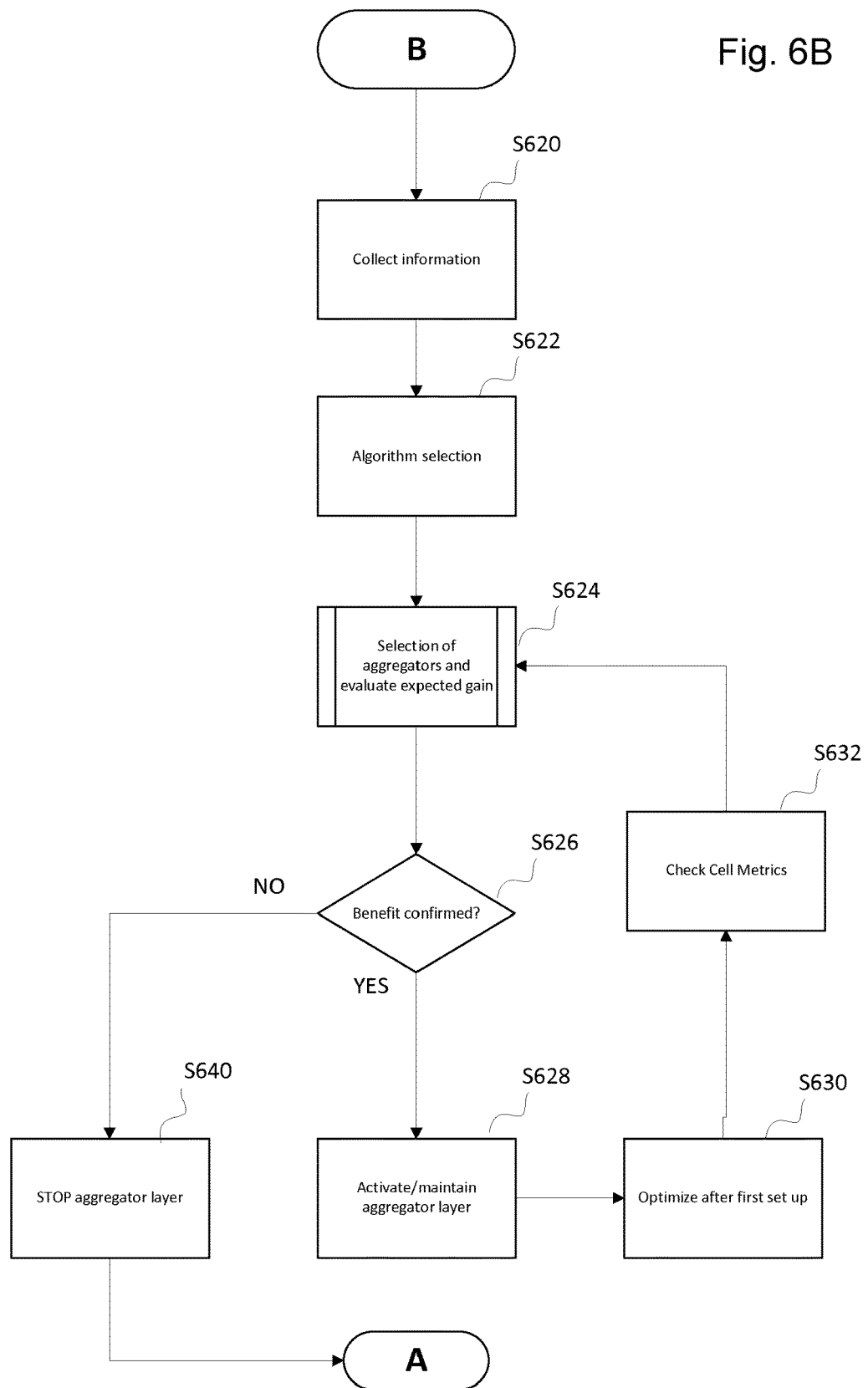

FIGS. 6A and 6B show a flowchart of an exemplary method in accordance with aspects of the present disclosure.

At operation S610, the controller obtains values for one or more cell or user related metrics, referred to hereafter as "cell metrics", thereby checking the performance of the macrolayer. The cell metrics may include for example, measurements of: cell load (for instance, resource block (RB) usage), cell throughput, number of active communication devices located in predefined portions of the cell coverage area, a "happiness" value (measured latency in data transfer, uplink waiting time, or a value obtained by inference from user feedback in social network services, for example); and/or control resource usage (e.g. PDCCH usage).

The cell metrics provide a measure of performance of the macrolayer that is used in determining whether the conditions in a component area of radio coverage offered by a cellular communication network support the activation of an aggregator facility. Here a component area of radio coverage may be selected from: a macrocell coverage area for at least one macrocell within the cellular telecommunications network; a coverage area for at least one sector within the macrolayer of the cellular telecommunications network; and the coverage area of the entire cellular telecommunications network.

In FIG. 6A, for example, this determination involves two distinct stages: operation S612, which deals with certain conditions hold that would make activation of an aggregator facility desirable (even necessary), and operation S614, which deals with further conditions which would determine whether such a facility would be feasible. In alternative approaches, the conditions that support activation of an aggregator facility may be performed in other ways, in particular operations S612 and S614 may be performed in parallel with one another or in "reverse" order; furthermore, all conditions may be assessed in a single procedure based on the cell metrics.

At operation S612, the controller determines whether the cell metrics meet target threshold values. This operation may include: determining whether cell load (i.e. RB usage) exceeds a load threshold while throughput lies below a minimum throughput threshold; determining whether the number of users in a region of the cell (such as the cell edge) exceeds a user number threshold while throughput per App falls below a minimum App throughput threshold; determining whether a happiness metric (whether aggregated for a number of users or a group of users or not) lies below a happiness threshold; and/or determining whether the usage of control resources (such as PDCCH) exceeds a control resource threshold.

If the cell metrics meet the target threshold conditions, the controller concludes that necessary conditions for aggregator layer deployment hold and moves to operation S614.

At operation S614, the controller determines whether certain conditions sufficient for aggregator layer deployment hold. The controller thus determined whether effective aggregator layer deployment will be possible. Operation S614 may include determining:

whether there are aggregator enabled communication devices (i.e. candidate aggregator devices) in the cell and whether these communication devices have certain characteristics in terms of mobility (e.g. they are, have been for an amount of time, and/or are expected to be, "static");

whether there are communication devices (aggregator enabled or not) in one or more macrocells with certain characteristics in terms of mobility (e.g. they are, have been for an amount of time, and/or are expected to be "static");

whether the controller has access to data concerning path loss towards the macrocell and/or amongst communication devices (e.g. UEs/terminals) and/or location information of the aggregators and/or the other communication devices;

whether there are communication devices in coverage of potential aggregators;

whether there is a matching between the capabilities (technology/band supported) between aggregators and nearby communication devices;

whether at least some of the aggregators have sufficient battery life to maintain aggregator functionality for a predetermined period of time;

whether conditions of low interference hold; and/or whether spectrum and technology resources needed for use in deployment of the aggregator layer are available.

If the controller concludes that sufficient conditions for aggregator layer deployment hold, the controller next performs operation S616. In certain alternative approaches, the controller performs operation S616 before or in parallel with the operations at S612 and/or S614.

In operation S616, the controller makes a preliminary determination of whether a benefit for the network would be expected if the network were to deploy the aggregator layer. This preliminary determination considers a limited number of properties of the cell metrics obtained at operation S610 and thus relies upon a subset of the information necessary for aggregator layer deployment: for instance, a benefit at this stage would be expected because there were several static users at cell edge under the potential coverage of some static aggregators.

If it is determined that either necessary conditions (at operation S612) or sufficient conditions (at operation S614) are not present, the controller waits a predetermined period of time (by setting a timer for example) and then obtains a further set of cell metrics (at operation S610). Likewise, should it be determined that no benefit is expected from the deployment of the aggregator layer (at operation S616), the controller will again return to operation S610 and obtain a further set of cell metrics.

If however, at operation S616, the controller makes a preliminary determination that there would be an expected benefit, in principle, for the network if the aggregator layer were to be deployed, the controller initiates a more detailed phase of operation (illustrated in FIG. 6B) by collecting further performance information, operation S620 (in addition to the cell metrics obtained at operation S610).

During the collection of further performance information, operation S620, the controller obtains a list of aggregator enabled communication devices (i.e. candidate aggregators) currently camped within a given macrocell, using information updates received, at temporally spaced-apart intervals, from the aggregators. In addition to the list of candidate aggregators, the further performance information may include some or all of the following information obtained from the respective aggregators:

location (of the updating aggregator). This location information may be obtained by the aggregator by inference from the RSRP and/or using a GPS unit.

pathloss/SINR (measured at the updating aggregator). This may be with respect to the current macrocell or a set of macrocells.

mobility level (static or not) measured by the aggregator itself information on location and/or pathloss of all UEs or other network connected communication devices that are static (optionally, this may be filtered to relate only to UEs that are static and that in addition are expected to remain static by analysing and using geolocalized historical information of the UE) and that are camped/ or are/have been connected there The controller processes some or all of this performance information to evaluate the relative distance and pathloss/SINR (or similar quality) between candidate aggregators and the devices of users in the cell.

In certain embodiments, the controller makes a selection of aggregators from among the aggregator enabled communication devices in accordance with a single aggregator selection algorithm. In other embodiments, there may be a plurality of available aggregator selection routines (i.e. algorithms) and it is first necessary to determine which routine to adopt. When required, the operation of determining which routine to use may be any conventional selection operation.

FIG. 6B illustrates one embodiment where a plurality of aggregator selection routines are available. Here, the available respective aggregator selection routines may each be suited to respective, different performance conditions. In operation S622, an algorithm corresponding to one of these routines is determined depending upon the availability of specific further performance information, such as aggregator location information or pathloss measurement data. In cases where only a single aggregator selection algorithm is available, the determination of which algorithm to use is trivial and operation S622 may be omitted.

Once it is determined which routine (i.e. algorithm) is suited to the available further performance information, this algorithm determines which, if any, aggregator enabled devices should be activated for aggregator functionality and defines the sub-processes by which benefit (i.e. achievable gain) from aggregator layer deployment will be calculated. The algorithm thus serves to select aggregators from among the candidate aggregators for deployment of the aggregator layer. The operation of this algorithm is illustrated as operation S624 in FIG. 6B.

At operation S624 (whether this is the only available aggregator selection routine or a routine determined to be suited to available further performance information at operation S622), the controller makes a selection from among the aggregator enabled communication devices, this selection being a selection of one or more aggregators based either on individual characteristics of the respective, selected aggregators or collective characteristics when the selected aggregators are considered as a group selected from among the aggregator enabled communication devices.

In certain embodiments, the selection of aggregators includes the selection as a group from some or all possible different groups or subsets of aggregator enabled communication devices, each group being termed an "evaluation group". An expected gain for each evaluation group is then calculated.

In other embodiments, the selection of aggregators is the selection of individual devices (i.e. subsets of aggregator enabled communication devices having a single member each). Here, expected gain is calculated for each individual candidate aggregator.

The expected (achievable) gain results from an evaluation of the expected improvement in a given cell metric: this cell metric may be the, or one of the, cell metrics obtained at operation S610. For example, the expected gain may be the result of a comparison between a) the value of that given cell metric when the or each aggregator is selected and b) the currently experienced (i.e. measured) value of that cell metric.

In certain cases, the expected gain may be expressed as the difference between the value of a given cell metric predicted for a given evaluation group (evaluated before actually activating that group for aggregator functionality) and the current value of the given cell metric. Where no aggregator enabled communication devices are activated, the current value of the cell metric is the measured value of the cell metric for the cellular communication network where no aggregator functionality is activated. Otherwise, the current value of the cell metric is the measured value of the cell metric for the network where a current group of aggregator enabled communication devices are activated for aggregator functionality, said current group need not be the evaluation group. The prediction of the cell metric may be a function of the further performance information collected at operation S620.

Where expected gain is determined for evaluation groups or individual candidate aggregators, the aggregator selection algorithm then assesses the respective expected gains for some or all possible different aggregators or groups of aggregators, the selected aggregator or group of aggregators may be the individual or group providing the greatest expected gain. Alternatively, the selected aggregator or group of aggregators may be a group from subset of groups having gains that exceed a threshold gain, taking account of other practical constraints such as maintaining aggregators that are already active unless there is a good reason to stop them (e.g.

battery level dropping below a level that can support continued operation or detected movement of the active aggregator).

At operation S626, the controller makes a full determination of whether a benefit for the network would be expected if the network were to deploy the aggregator layer by modelling network performance for a network with the selected aggregator or group of aggregators activated and comparing that performance to the currently measured network performance information (as collected at operation S620).

In the case of the aggregator selection using evaluation groups, the full determination of benefit for the network entails comparing the expected gain from the use of the selected evaluation group of aggregators to data representative of the current network performance.

In a specific example where one of the selected subsets of aggregators is not currently active, sufficient benefit from first activation of that selected subset would be confirmed where the measured value of a given cell metric (assuming the given cell metric is the one used in the algorithm at operation S624) is significantly higher than that cell metric measured before the activation.

In another example where the aggregator layer is activated (i.e. at least one subset of aggregator enabled communication devices are activated for aggregator functionality), sufficient benefit is confirmed when the gain is higher than one of a reference average metric (e.g. historical data) or a cell metric measured in the previous last N iterations, where N is an integer greater than 1.

If the determination at operation S626 is that a net benefit is indeed provided by deploying the selected device or group of devices (i.e. subset) as the aggregators, the controller activates an aggregator server (operation S628) to support the aggregator layer and instructs each of the selected communication devices to activate (or maintain active) their respective aggregator functionalities (e.g. by executing a routine in an aggregator client application). These aggregator functionalities include functionalities consistent with operation as a MiFi architecture access point (offering WiFi protocol connectivity to nearby communication devices) and/or as a small cell (offering connectivity using a cellular telecommunications standard).

While not illustrated in FIG. 6B, the controller may conveniently launch a RAT selection routine to determine which carrier bandwidth/RAT/band will be used by each (selected) aggregator, the carrier bandwidth/RAT/band being chosen from among one or more permutations of available RAT, band, and carrier bandwidth available for the implementation of an aggregator layer in a specific cell. For instance, the RAT selection routine may determine that as LTE FDD2.6 is not used in current and/or neighbour macrocell, it can be used by all selected aggregators within range of those cells.

As discussed in relation to FIG. 4, nearby communication devices may transfer some or all of their data traffic to the selected aggregator(s) differently depending upon whether they are in an "idle" or "connected" state.

In the former case, handoff of idle devices may be facilitated by the controller modifying the neighbour cell list (NCL), which is provided to devices in idle modes, with the parameters of the selected active aggregators.

In the latter case, the controller may determine whether to request a handover for a device in connected state when information such as radio measurements from communication devices in the macro cell compare unfavourably with radio measurements from communication devices using the selected aggregators (always providing such information is available at it might be from access to the relevant RRM function of the eNodeB/RNC in the macrocell). Examples of communication devices for which a handover might be requested include those devices: a) that are in the coverage area of a specific aggregator(s) and b) that have channel quality indicator (CQI) and/or RSRP in relation to the macrocell that is worse than the one of the aggregators.

While not illustrated in FIG. 4, the aggregator may alternatively (or additionally) offer WiFi protocol connectivity to nearby communication devices (thereby operating as a MiFi architecture access point). In such cases, handoff onto the aggregation functionality may be effected by informing respective nearby communication devices which aggregators offer an access point in the cell and by commanding those communication devices close to the identified access points to enable Wi-Fi transmission.

Optionally, the controller may then seek to optimise the aggregator layer, operation S630.

Optimization by the controller may include at least one of the following procedures:

checking, once a given nearby communication device is connected to an aggregator, whether that device has a worse CQI/SINR/RSRP with respect to the the macrocell than with respect to the aggregator, and in such a case will be (or can be) handed over to the Macro layer (e.g. by issuing a handover command or releasing the aggregation connection with redirection). Conveniently the selection parameters for this device would be changed for an amount of time to avoid unwanted ping-pong effects (i.e. hysteresis);

checking the performance in the aggregator layer against the performance that would be expected if a given communication device were to stay in the macrolayer, depending on which information can be made available to the controller and/or to the aggregator. Examples of the performance information that may be checked include measures of user happiness metrics such as: latency (i.e. the round trip time (RTT) for transmitted and received packets or uplink waiting time. Examples of the performance information that may be checked may also include: historical data (such as throughput for specific Apps) obtained in the macrolayer in similar or same location and under the same or similar RSRP/CQI conditions;

checking the level of interference and/or availability of resources for the spectrum/technology used in the aggregator layer and taking actions to improve these parameters (e.g. create clusters of spectrum/technology utilization, reduce utilization of those resources in the macrolayer); and optimizing the selection of aggregators taking account of mobility. The aggregators themselves may be required to take certain actions when aggregated users (i.e. communication devices using the aggregation facility of a selected aggregator) start mobility. Likewise, when aggregators themselves become mobile, the controller may act to alter the performance of the aggregator later, e.g. by instructing the newly mobile aggregator to switch off aggregation functionality.

Checking the performance in the aggregator layer using RTT may involve comparing RTT for the same packet using macrocell and current aggregator layer service respectively. Using uplink waiting time to check performance may involve comparing this time before and after the optimization.

Checking the performance in the aggregator layer using historical data may involve comparing historical data to actual data obtained through the aggregator. It is also possible to run periodical speed tests just to check the current quality.

Whether optimised as described or not, the controller iterates back through operations S622, S624 and S626, selecting one or more aggregators which may be identical to the aggregator(s) selected in previous iterations or may represent a group having a different constitution of aggregator enabled communication devices.

Periodically, cell metrics are checked—operation S632—and this information is used in further iterations of operations S622, S624 and S626. The cell metrics checked here may be the same as those obtained at operation S610: equally they may be different from those cell metrics.

If the determination at operation S626 is that a net benefit is not in fact provided by deploying the selected devices (or group of devices) as aggregators, the controller halts the use of the aggregator layer operation S640. This may entail instructing all aggregator enabled communication devices in the cell to deactivate their aggregator functionality and to deactivate the aggregator layer server in the controller.

After a second predetermined time (typically longer in duration than the period characteristic of the iteration of operations S622, S624 and S626), the controller restarts first phase of determining the preliminary benefit of aggregator layer deployment at operation S610.

In a further embodiment of the present disclosure, more than one aggregation layer is activated within the network. In certain cases, respective aggregation layers are activated and deactivated in corresponding sectors or groups of sectors of the cellular network. In certain cases aggregation layers are established within one sector or cell that extend the coverage of that sector or cell to encompass communication devices served by neighbouring sectors or cells: thus the benefit to the network of the deployment of any given aggregation layer may be calculated for a region of the radio coverage of the cellular network that includes more than one sector and/or cell.

Certain embodiments of the present disclosure relate to the dynamic activation of one or more communication devices to provide an aggregation layer. Each of the one or more communication devices appears, to the macrolayer as a UE; while to other communication devices, they each appear as a class of small cell base transceiver station. The dynamic activation is due in part to determining if a benefit could be expected by such dual UE/small cell activation: that might arise if the macrolayer doesn't provide a prerequisite quality of service to the other communication devices. Dynamic activation also requires a more fine-tuned determination dependent upon selecting a set of devices capable of the dual UE/small cell or UE/MiFi functionality for activation and determining whether the network would benefit from the activation of that particular group. Only where the network is determined to benefit on the basis of this fine-grained determination will the selected communication devices be activated as hybrid UE/small cells (or UE/MiFi devices).

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing description refer to LTE, it should be noted that the aggregator architecture described may equally be deployed in telecommunications networks based on other cellular telecommunication architectures, for example 2G, 3G, LTE-Advanced (3GPP Release 10 onwards), future architectures (e.g., 5G), as well as WD-CDMA and WiMAX. The aggregator architecture is agnostic to the specific type of RAN used. In other words, the aggregator controller/controller entity is adapted to work with any RAN and/or combinations of RANs. This is, for example, one of the reasons why in certain embodiments the aggregator controller/controller entity is independent of the RAN. Similar observations apply for the communication device for providing an aggregator facility.

In addition, it will be apparent to the reader that the term radio access technology (RAT) may extend to include related technologies such as conventional WiFi technologies (i.e. compliant with the IEEE 802.11 family of standards) where the context requires or allows this.

Furthermore, while the above description describes the aggregation layer as providing a bridge to the cellular network for communication devices that are at the edges of cells, the skilled reader will appreciate that dynamic coverage "blackspots" may arise elsewhere within radio coverage regions (for example, due to equipment malfunction, unusual usage patterns, and/or features of the natural or built environment).

It will also be well understood by persons of ordinary skill in the art that whilst the described embodiments implement certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A method for determining functionality of communication devices in a cellular communication network including a plurality of communication devices, the method comprising:
   obtaining at least one measure of the performance of the cellular communication network in a component area of radio coverage;
   determining from the each measure of performance whether performance conditions in the component area of radio coverage support the activation of an aggregator facility, said aggregator facility providing radio coverage to at least one first communication device within a selected geographical area;
   determining from the each measure of performance whether a net benefit is expected for the performance of the network in the component area as a result of the activation of the aggregator facility; and
   controlling activation of an aggregator functionality at at least one second communication device when performance conditions in the component area of radio coverage support the activation of the aggregator facility and when a net benefit is expected.

2. A method as claimed in claim 1, wherein determining whether a net benefit is expected as a result of the activation of the aggregator facility includes:
   determining whether the number of static first communication devices located in a portion of the component area within range of the at least one second communication device exceeds a threshold number.

3. A method as claimed in claim 1, wherein determining whether performance conditions support the activation of an aggregator facility includes:
   determining whether network conditions necessary for the activation of an aggregator facility hold for a given component area of radio coverage; and
   determining whether network conditions sufficient to support the activation of an aggregator facility hold for the component area.

4. A method as claimed in claim 3, wherein determining whether the network conditions necessary for the activation of an aggregator facility hold includes at least one of:
   determining whether cell load exceeds a load threshold while throughput lies below a minimum throughput threshold;
   determining whether the number of users in a region of the cell exceeds a user number threshold while throughput for a given application falls below a minimum throughput threshold;
   determining whether a happiness metric lies below a happiness threshold; and/or
   determining whether the usage of control resources exceeds a control resource threshold.

5. A method as claimed in claim 3, wherein the network conditions sufficient for the activation of an aggregator facility depend upon the level of at least one of the following parameters:
   the number of communication devices in the component area of radio coverage;
   the number of communication devices in the component area of radio coverage having activated aggregator functionality;
   signal to interference plus noise ratio, SINR;

path loss/received signal received power, RSRP;
the available radio access technologies, operational frequency bands and/or carriers; location information of the communication devices;
mobility information of the communication devices; and
predicted device power profile for the at least one communication devices.

6. A method as claimed in claim 1, wherein the at least one second communication device is one of: a user equipment (UE); a machine type communication (MTC) device; a repeater; a relay unit; an access point; wireless station; small cell station; or a dedicated aggregator facility communication device.

7. A method as claimed in claim 1, wherein determining whether a net benefit is expected as a result of the activation of the aggregator facility is performed on a macrocell basis for at least one macrocell within the cellular telecommunications network.

8. A controller entity for determining functionality of communication devices in a cellular communication network including a plurality of communication devices, the controller entity comprising:
one or more processors;
one or more computer-readable hardware storage devices having stored thereon computer-executable instructions that are structured to be executable by the one or more processors to thereby cause the controller entity to:
obtain at least one measure of the performance of the cellular communication network in an area of radio coverage;
determine from the each measure of performance whether performance conditions in the area of radio coverage support the activation of an aggregator facility, said aggregator facility providing radio coverage to at least one first communication device within a selected geographical area;
determine from the each measure of performance whether a net benefit is expected for the performance of the network in the component area as a result of the activation of the aggregator facility; and
control activation of an aggregator functionality at at least one second communication device when performance conditions in the component area of radio coverage support the activation of the aggregator facility and when a net benefit is expected.

9. A controller entity as claimed in claim 8, wherein the controller entity is configured to determine whether a net benefit is expected as a result of the activation of the aggregator facility by determining whether the number of static first communication devices located in a portion of the component area within range of the at least one second communication device exceeds a threshold number.

10. A controller entity as claimed in claim 8, wherein the controller entity is configured to determine whether performance conditions support the activation of an aggregator facility by determining whether network conditions necessary for the activation of an aggregator facility hold for a given component area of radio coverage; and determining whether network conditions sufficient to support the activation of an aggregator facility hold for the component area.

11. A controller entity as claimed in claim 10, wherein the controller entity is configured to determine whether the network conditions necessary for the activation of an aggregator facility hold by performing at least one of:
determining whether cell load exceeds a load threshold while throughput lies below a minimum throughput threshold;
determining whether the number of users in a region of the cell exceeds a user number threshold while throughput for a given application falls below a minimum throughput threshold;
determining whether a happiness metric lies below a happiness threshold; and/or
determining whether the usage of control resources exceeds a control resource threshold.

12. A controller entity as claimed in claim 10, wherein the network conditions sufficient for the activation of an aggregator facility depend upon the level of at least one of the following parameters:
the number of communication devices in the component area of radio coverage;
the number of communication devices in the component area of radio coverage having activated aggregator functionality;
signal to interference plus noise ratio, SINR;
path loss/received signal received power, RSRP;
the available radio access technologies, operational frequency bands and/or carriers;
location information of the communication devices;
mobility information of the communication devices; and
predicted device power profile for the at least one communication devices.

13. A controller entity as claimed in claim 8, wherein the at least one second communication device is one of: a user equipment (UE); a machine type communication (MTC) device; a repeater; a relay unit; an access point; wireless station; small cell station; or a dedicated aggregator facility communication device.

14. A controller entity as claimed in claim 8, wherein determining whether a net benefit is expected as a result of the activation of the aggregator facility is performed on a macrocell basis for at least one macrocell within the cellular telecommunications network.

15. A computer program comprising instructions arranged, when executed, to implement a method in accordance with claim 1.

* * * * *